United States Patent
Aldea et al.

(10) Patent No.: US 7,311,964 B2
(45) Date of Patent: Dec. 25, 2007

(54) INORGANIC MATRIX-FABRIC SYSTEM AND METHOD

(75) Inventors: Corina-Maria Aldea, St. Catharines (CA); David Geraint Roberts, Youngstown, NY (US)

(73) Assignee: Saint-Gobain Technical Fabrics Canada, Ltd. (CA)

(*) Notice: Subject to any disclaimer, the term of this patent is extended or adjusted under 35 U.S.C. 154(b) by 88 days.

(21) Appl. No.: 10/209,471

(22) Filed: Jul. 30, 2002

(65) Prior Publication Data

US 2004/0025465 A1 Feb. 12, 2004

(51) Int. Cl.
*C04B 14/00* (2006.01)

(52) U.S. Cl. .............. 428/297.4; 52/741.3; 52/741.41; 52/515; 106/14.15; 106/14.18; 106/638; 428/292.1; 428/293.4; 428/293.7; 428/294.7; 428/299.4; 428/300.1

(58) Field of Classification Search ........... 52/514–515, 52/741.3–742.16; 106/14.05, 14.15, 14.18, 106/14.21, 14.39, 600, 608, 638, 639; 156/71; 428/98–111, 95–96, 43–44, 391–392, 359–357, 428/22, 411.1, 294.7, 292.1, 293.1, 293.4, 428/293.7, 294.1, 294.4, 295.1–295.4, 296.1–296.4, 428/296.7, 297.1–297.4, 297.7, 299.4, 298.1–298.4, 428/200.1, 312.2

See application file for complete search history.

(56) References Cited

U.S. PATENT DOCUMENTS 1,266,574 A * 5/1918 Ford ................... 52/411
1,444,709 A * 2/1923 Andry ................. 52/328

(Continued)

FOREIGN PATENT DOCUMENTS

| DE | 92 06931 | 9/1992 |
|---|---|---|
| EP | 0 106 986 A2 | 2/1984 |
| EP | 0 732 464 A1 | 9/1996 |
| EP | 1 092 693 A2 | 4/2001 |
| EP | 1 170 440 A1 | 1/2002 |
| EP | 1 172 343 A1 | 1/2002 |
| FR | 7139963 | 11/1971 |
| FR | 2 808 795 A1 | 11/2001 |
| FR | 2 810 661 A1 | 12/2001 |
| JP | 58 060643 | 4/1983 |
| JP | 06 323682 | 6/1996 |
| JP | 10152361 A | 6/1998 |
| JP | 2002/88614 | 3/2002 |
| JP | 2003-253891 | 10/2003 |
| WO | WO 97/42444 | 11/1997 |
| WO | WO 01/32341 A1 | 5/2001 |
| WO | WO 01/92180 A1 | 12/2001 |
| WO | WO 02/00566 A1 | 1/2002 |
| WO | WO 02/02853 | 1/2002 |
| WO | WO 02/42064 A1 | 5/2002 |

OTHER PUBLICATIONS

Abuse–Resistant Systems, U.S. Gypsum Co. SA 929, pp. 1–12.
Plaster Systems, U.S. Gypsum Co., SA 920, 5 pages.
USG Sheetrock Joint Tape, U.S. Gypsum Co., 2 pages.
Reinforcing Tapes, 2 pages.

(Continued)

*Primary Examiner*—Jeanette Chapman
(74) *Attorney, Agent, or Firm*—Duane Morris LLP

(57) ABSTRACT

A method of reinforcing a structural support, includes applying a reinforcement system comprising an AR-glass fibrous layer embedded in an inorganic matrix to the structural support. The AR-glass fibrous layer has a sizing applied thereon, and a resinous coating applied is applied over the sizing. The inorganic matrix is adherent to the resinous coating and the resinous coating is adherent to the sizing.

14 Claims, 15 Drawing Sheets

U.S. PATENT DOCUMENTS

| | | | | |
|---|---|---|---|---|
| 1,469,611 A | * | 10/1923 | Assersor | 405/216 |
| 1,637,410 A | * | 8/1927 | Clayton | 52/733.2 |
| 1,892,433 A | * | 12/1932 | Huff | 138/145 |
| 1,999,325 A | * | 4/1935 | Borsari-Fischer | 52/515 |
| 2,210,444 A | * | 8/1940 | Otley | 52/515 |
| 3,027,272 A | * | 3/1962 | Ratzel | 428/134 |
| 3,110,981 A | * | 11/1963 | Larner | 62/262 |
| 3,391,037 A | | 7/1968 | McNulty | |
| 3,671,372 A | | 6/1972 | Hoffman | |
| 4,015,994 A | | 4/1977 | Hill | 106/99 |
| 4,042,749 A | | 8/1977 | Sandvig | |
| 4,105,824 A | | 8/1978 | Monte | |
| 4,115,135 A | * | 9/1978 | Goeman | 428/55 |
| 4,118,239 A | * | 10/1978 | Gagin | 501/38 |
| 4,123,287 A | | 10/1978 | Cockram | 106/99 |
| 4,140,533 A | | 2/1979 | Ohtomo et al. | 106/50 |
| 4,188,454 A | | 2/1980 | Foley et al. | 428/391 |
| 4,228,208 A | | 10/1980 | Smith et al. | 428/95 |
| 4,229,473 A | | 10/1980 | Elber | |
| 4,272,294 A | | 6/1981 | Jaunarajs | 106/99 |
| 4,288,962 A | | 9/1981 | Kavanaugh | 52/743 |
| 4,341,835 A | | 7/1982 | MacDowell | 428/292 |
| 4,355,128 A | | 10/1982 | Mercer | |
| 4,390,574 A | | 6/1983 | Wood | |
| 4,454,267 A | | 6/1984 | Williams | |
| 4,604,319 A | | 8/1986 | Evans et al. | |
| 4,657,594 A | | 4/1987 | Struss | |
| 4,686,253 A | | 8/1987 | Struss et al. | |
| 4,776,865 A | | 10/1988 | Allaire | 65/3.2 |
| 4,830,989 A | | 5/1989 | Trivedi et al. | 501/35 |
| 4,836,715 A | | 6/1989 | Wood | |
| 4,923,517 A | * | 5/1990 | Rerup et al. | 524/3 |
| 4,935,301 A | * | 6/1990 | Rerup et al. | 428/375 |
| 4,963,408 A | | 10/1990 | Huegli | |
| 5,075,358 A | | 12/1991 | Riley et al. | |
| 5,110,656 A | | 5/1992 | Inaba et al. | 428/257 |
| 5,218,810 A | | 6/1993 | Isley, Jr. | 52/725 |
| 5,225,237 A | | 7/1993 | Magnani | 428/227 |
| 5,308,692 A | | 5/1994 | Kennedy et al. | |
| 5,344,280 A | | 9/1994 | Langenbrunner et al. | |
| 5,486,394 A | | 1/1996 | Stough | |
| 5,607,527 A | | 3/1997 | Isley, Jr. | 156/71 |
| 5,647,180 A | | 7/1997 | Billings et al. | |
| 5,653,797 A | | 8/1997 | Patel | |
| 5,678,374 A | * | 10/1997 | Fukuoka | 52/514 |
| 5,687,523 A | | 11/1997 | Stough | |
| 5,736,246 A | | 4/1998 | Augier et al. | 428/392 |
| 5,763,043 A | | 6/1998 | Porter et al. | 428/109 |
| 5,766,724 A | | 6/1998 | Tailor et al. | |
| 5,836,357 A | | 11/1998 | Kittson et al. | |
| 5,846,368 A | | 12/1998 | Sakaguchi et al. | |
| 5,916,361 A | * | 6/1999 | Molloy et al. | 106/696 |
| 5,993,114 A | | 11/1999 | Jones | |
| 6,017,588 A | | 1/2000 | Watanabe et al. | 427/407.1 |
| 6,018,914 A | | 2/2000 | Kamiyama et al. | |
| 6,054,205 A | | 4/2000 | Newman et al. | |
| 6,117,551 A | | 9/2000 | Nagata et al. | |
| 6,123,485 A | | 9/2000 | Mirmiran et al. | 405/252 |
| 6,123,879 A | | 9/2000 | Hendrix et al. | 264/31 |
| 6,170,531 B1 | | 1/2001 | Jung et al. | |
| 6,177,185 B1 | * | 1/2001 | Face, Jr. | 428/325 |
| 6,183,835 B1 | | 2/2001 | Cho et al. | |
| 6,219,988 B1 | | 4/2001 | Mahfouz et al. | 52/721.4 |
| 6,219,991 B1 | | 4/2001 | Salek-Nejad | 52/741.3 |
| 6,228,312 B1 | | 5/2001 | Boyce | |
| 6,237,292 B1 | | 5/2001 | Hegemier et al. | 52/273 |
| 6,254,709 B1 | | 7/2001 | Kamiyama et al. | |
| 6,254,817 B1 | | 7/2001 | Cooper et al. | 264/171.13 |
| 6,261,360 B1 | | 7/2001 | Dry | 106/677 |
| 6,263,629 B1 | | 7/2001 | Brown, Jr. | 52/309.16 |
| 6,265,056 B1 | | 7/2001 | Rieder et al. | 428/294.7 |
| 6,315,499 B1 | | 11/2001 | Kittson | 405/258.1 |
| 6,316,058 B1 | * | 11/2001 | Moireau et al. | 427/428 |
| 6,322,888 B1 | * | 11/2001 | Moireau et al. | 428/378 |
| 6,330,776 B1 | | 12/2001 | Jinno et al. | 52/649.1 |
| 6,332,992 B1 | | 12/2001 | Chatelain | 264/69 |
| 6,340,522 B1 | | 1/2002 | Burke et al. | 428/359 |
| 6,344,081 B1 | | 2/2002 | Pelot et al. | 106/711 |
| 6,391,131 B1 | | 5/2002 | Newman et al. | 156/39 |
| 6,436,185 B1 | | 8/2002 | Ayambem et al. | |
| 2001/0047844 A1 | | 12/2001 | Edwards et al. | 156/91 |
| 2001/0049399 A1 | | 12/2001 | Edwards et al. | 521/101 |
| 2004/0074184 A1 | | 4/2004 | Naji | |

OTHER PUBLICATIONS

Reinhart et al., Engineered Materials Handbook, 1987, vol. 1: pp. 27–37, "Introduction to Composites" and pp. 479–495, "Joints".

International Search Report dated Jan. 15, 2004.

Warrren et al., Decision on Appeal No. 2003–1901, Mar. 9, 2004, pp. 1–10, U.S. Patent and Trademark Office.

Bischoff, Textile Reinforced Concrete Facade Elements—An Investigation to Optimize Concrete Composite Technologies, $43^{rd}$ International SAMPE Symposium and Exhibition (Proceedings) May 31–Jun. 4, 1998, vol. 43 n. 2 1998, pp. 1790–1802.

Perez–Pena, et al., Mechanical Properties of Fiber Reinforced Lightweight Concrete Composites, Cement and Concrete Research, vol. 24, No. 6, pp. 1121–1132, 1994.

Jones, John, Glass Fibers for Exceptional Product Properties, Inorganic–Bonded Wood and Fiber Composite Materials, vol. 7 2000.

Hegger, et al., New Composite Material Textile–Reinforced Concrete, Betonwerk Fertigteil Tech, vol. 68, No. 2, pp. 22–24, Feb. 26, 2002.

Nakagawa, et al., Fiber reinforced concrete: developments and applications to buildings, Advanced Composite Materials, vol. 3., No. 2, pp. 123–131 (1993).

Grimer, et al., The strengths of cements reinforced with glass fibres, Magazine of Concrete Research vol. 21 in 66, pp. 23–30, Mar. 1969.

Muller, et al., Recent Developments in Glass Fibre Reinforced Cement, Vetrotex Cem–FIL, Spain.

FYFE Co. LLC, Tyfo® Fabricated Composite Systems for New Construction and Retrofits.

MBRACE® Composite (FRP) Strengthening Systems., Systms to Extend the Life of Concrete, Masonry Timber and Steel Structures Reinforced with FRP based on Carbon and Aramid (KEVLAR®) fibres., Sep. 2000, Ref No. 0351.

Weber and Broutin United Kingdom, SBD Construction solutions, En–Force Composite Strengthening.

ICBO Evaluation Service, Inc., Acceptance Criteria for Concrete and Reinforced and Unreinforced Masonry Strengthening Using Fiber–Reinforced, Composite Systems, Apr. 1997.

Fyfe Co, LLC, Tyfo® Concrete Repair System.

Fyfe Co. LLC, TYFO® Systems for Unreinforced Masonry (URM) and Reinforced Concrete/Masonry Wall Strengthening.

Fyfe Co. LLC, TYFO® Fibrwrap to "Extend–The–Life" of Cracked and Spalled Concrete Members.

Fyfe Co. LLC, "The Fibrwrap Company" TYFO® CIS, Corrosion Inhibitors Type S.

Fyfe Co. LLC, "The Fibrwrap Company" TYFO® SW Fibrwrap® For Underwater Applications Using Both Glass and Carbon Fiber Reinforced TYFO® Materials, Combined with our Tyfo® Epoxy Matrices.

Fyfe Co. LLC, "The Fibrwrap® Company" TYFO® Fibrwrap® Systems for Blast Hardening and Mitigation.

Fyfe Co. LLC, "The Fibrwrap® Company" TYFO® Systems for Wood.

Fyfe Co. LLC, "The Fibrwrap® Company" TYFO® Fibrwrap® Systems for Chimneys, Stacks, and Tanks.

FyfeCo. LLC, "The Fibrwrap® Company" TYFO® Systems for Beams and Slabs.

Fyfe Co. LLC, "The Fibrwrap® Company" TYFO® Fibrwrap® For Reinforced Concrete Columns.

Fyfe Co. LLC, "The Fibrwrap® Company" TYFO® Fire-Resistant Systems.

Fyfe Co. LLC, "The Fibrwrap® Company"TYFO® Viscoelastic Dampers.

Fyfe Co. LLC, "The Fibrwrap® Company" TYFO® UG Composite Laminate Strip System.

Hexcel® Civil Engineering and Construction Systems, Repair and Strengthening Solutions for the Construction Industry, Hex–3R.

Polyplast Strengthening System, Polyplast Strengthening Systems Ltd. Product Information.

Direct Roving for Weaving Input, Saint–Gobain Vetrotex.

Corradi, et al., Strengthening Techniques Tested on Masonry Structures Struck by the Umbria–Marche Earthquake of 1997–1998, Construction Building Materials, vol. 16, (2002) pp. 229–239.

Experimental Study On Woven Glass Fabrics for Cementitious Applications, GRC 2002, 12th International Glass Fibre Reinforced Concrete Congress, Dublin, Ireland, May 14–16, 2001.

* cited by examiner

US 7,311,964 B2

INORGANIC MATRIX-FABRIC SYSTEM AND METHOD

FIELD OF THE INVENTION

This invention relates to structural supports, and more particularly to a method and reinforcement system for strengthening of such structural supports.

BACKGROUND OF THE INVENTION

Walls, columns and other structures constructed of materials such as concrete or cement paste, brick or masonry units, and the like are widely used as support structures. Tunnels, building structural supports, bridge supports, freeway overpass supports and parking structure supports are just a few of the many uses for these cementitious structural supports. These supports may exist in a wide variety of shapes with circular, square and rectangular cross-sections being the most common. However, numerous other cross-sectional shapes have been used, including regular polygonal shapes and irregular cross-sections. The size of structural supports also varies greatly depending upon the intended use. Structural supports having heights and lengths exceeding 50 feet are commonly used in various applications.

It is common practice to reinforce concrete structural supports with steel rods, mesh, or bars. The steel reinforcement provides a great deal of added structural strength (e.g., compression, tensile, flexural and/or shear-resistance) to the support, but there have been numerous incidents of structural failure of these supports when subjected to asymmetric loads and horizontal displacement generated during earthquakes or explosions. Concrete structures, while adequate in compression, are subject to cracking, collapse, and partial loss due to stresses associated with earthquakes, explosions, land subsidence and overloading. Structural failure of such structures can have devastating consequences. Accordingly, there is a continuing need to enhance the ability of reinforced and unreinforced concrete and cement structural supports to withstand the asymmetric loads and horizontal displacements which are applied during an earthquake or explosion.

One way of increasing the structural integrity of support structures is to include additional metal reinforcement prior to forming the structural support. Other design features may be incorporated into the support structure fabrication in order to increase its resistance to asymmetric loading or horizontal displacement. However, there are hundreds of thousands of existing structural supports located in earthquake prone areas, which do not have adequate metal reinforcement or structural design to withstand high degrees of asymmetric loading or horizontal displacement. Accordingly, there is a need to provide a simple, efficient and relatively inexpensive system for reinforcing such existing structural supports to prevent or reduce the likelihood of failure during an earthquake or explosion.

One approach to reinforcing cementitious structures, such as concrete columns, is to wrap the exterior surface of the structure with a composite reinforcement layer, or fabric reinforced plastic (FRP). In U.S. Pat. No. 5,607,527 to Isley, Jr., a composite reinforcement layer having at least one fabric layer located within a resin matrix is wrapped around the exterior surface of a concrete column. The fabric layer has first and second parallel selvedges that extend around the circumferential outer surface of the column in a direction substantially perpendicular to the column axis. Preferred fibers disclosed by Isley include ones made from glass, polyaramid, graphite, silica, quartz, carbon, ceramic and polyethylene. Suitable resins suggested by this patent include polyester, epoxy, polyamide, bismaleimide, vinylester, urethanes, and polyurea, with epoxy-based resins being preferred.

Another approach to reinforcing a cementitious structural support is disclosed in U.S. Pat. No. 6,017,588 to Watanabe, et al. This patent discloses using an FRP to reinforce a structural support by forming a primer layer on the surface of the support structure, forming, if necessary, a putty layer on the primer layer, applying an impregnating resin on the primer layer (or putty layer) before, after or, before and after, cladding with fiber sheets to allow the resin to penetrate into the spaces in the fiber sheets, followed by curing the resin, the primer, putty and impregnating resin. The primer, putty and impregnating resin of this reference all include a resin composition. The disclosed fiber sheets may include carbon, aramid or glass fibers. The asserted advantage of the reinforcement structure of this patent is increased adherence of the reinforcement to the surface of the structural support.

Reinforcing FRP systems such as those described above can often be flammable, toxic and difficult to handle during application. They also provide, after curing, poor fire resistance, poor bonding to the concrete or brick being reinforced, and poor water/air permeability, resulting in the creation of moisture accumulation. Additionally, they are fairly expensive and tend to delaminate upon failure.

A repair or reinforcement system for existing support structures or for new construction support structures is needed.

SUMMARY OF THE INVENTION

In accordance with a first preferred embodiment of the present invention, a method for reinforcing a structural support is provided. This method comprises applying a reinforcement system having an alkali-resistant fibrous layer embedded in an inorganic matrix to a structural support.

The preferred alkali-resistant fibrous layer is comprised of AR-glass having a sizing applied thereon, and a resinous coating applied over the sizing, the inorganic matrix being adherent to the resinous coating and the resinous coating being adherent to the sizing. Unlike other types of glass fibers, such as E-glass, AR-glass has a high degree of resistance to alkali attack and higher strength retention over time. This is due to the presence of an optimum level of Zirconia ($ZrO_2$) in the glass fibers. This type of glass exhibits a high degree of chemical resistance, resisting the very high alkalinity produced by the hydration of conventional cementitious materials such as ordinary Portland cement.

The preferred inorganic matrix is comprised of cementitious material such as cement, concrete or mortar. More preferably the inorganic matrix comprises ordinary Portland cement having chopped reinforcing fibers dispersed throughout the cement. Such fibers may include those made from carbon, AR-glass, cellulose, rayon or polymeric materials, such as aramids, polyolefins, polyester, or hybrids thereof, for example.

According to another embodiment of the present invention, a method of reinforcing a structural support comprises a) applying a first layer of an inorganic matrix to the structural support, b) embedding a first AR-glass open fibrous layer into the matrix, said AR-glass fibrous layer having a sizing applied thereon, and a resinous coating applied over the sizing, the inorganic matrix being adherent to the resinous coating, and the resinous coating being adherent to the sizing, and c) applying a second layer of the inorganic matrix to the first AR-glass open fibrous layer. Additional fibrous layers and layers of inorganic matrix may also be added.

According to another embodiment of the present invention, a structural support system is provided including a structural support, and a reinforcement system adhered to the structural support, the reinforcement system comprising an AR-glass fibrous layer embedded in an inorganic matrix, wherein the AR-glass fibrous layer has a sizing applied thereon, and a resinous coating applied over the sizing, the inorganic matrix being adherent to the resinous coating, and the resinous coating being adherent to the sizing.

According to a further embodiment of the present invention, a method of reinforcing a structural support is provided comprising applying a reinforcement system having a fibrous layer embedded in an inorganic matrix to the structural support. The fibrous layer comprises PVA fibers, carbon fibers, aramid fibers, or a combination thereof.

DETAILED DESCRIPTION

Figure 1:
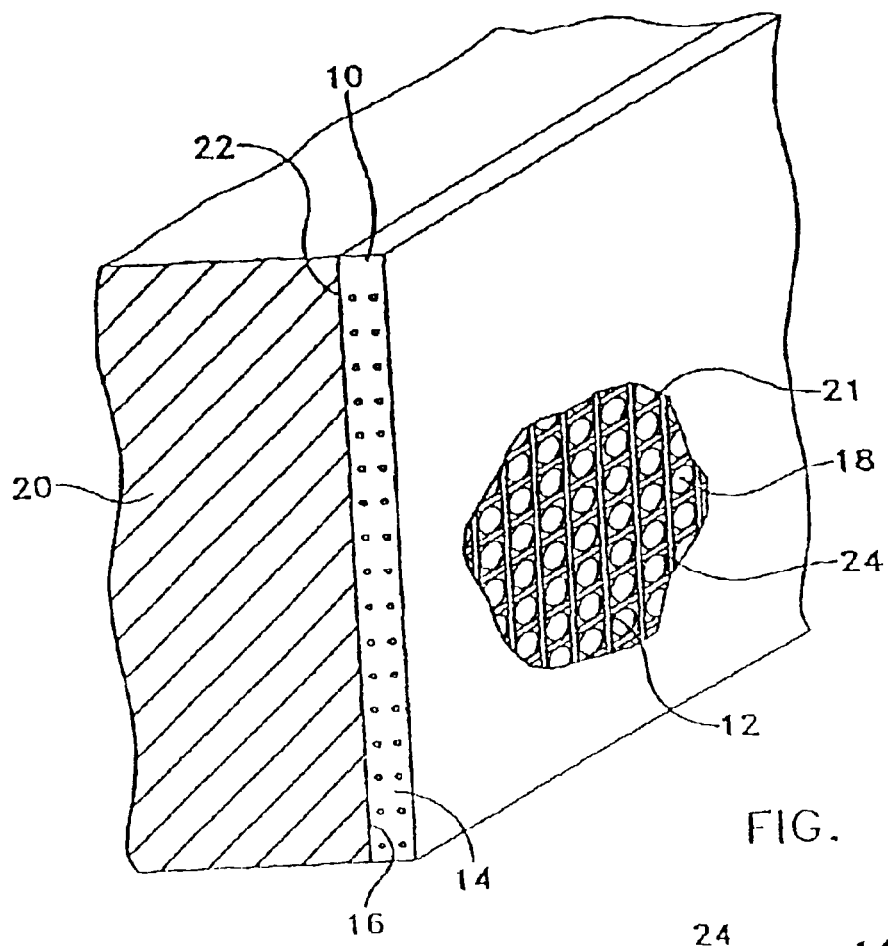
FIG. 1 is a perspective cross-sectional view of a support structure having an exemplary reinforcement system according to the present invention.

A reinforcement system and a method of reinforcing a structural support using the reinforcement system of the present invention are provided. The reinforcement system has improved bonding with a cementitious support structure and is less likely to delaminate from the structural support than existing reinforcement systems.

In accordance with the present invention, the following terms are defined:

Adhesive bonded crossed laid fibers/mesh. Woven fabrics consisting of layers of parallel textile yarns superimposed on each other at acute or right angles. These layers are bonded at the intersections of the yarns by an adhesive, glue or by thermal bonding.

Cementitious material/composite. An inorganic hydraulically setting material, such as those containing portland cement, mortar, plaster, fly ash, slag, silica fume, metakaolin, gypsum, geopolymer and/or other ingredients, such as aggregate, including sand or gravel, additives or admixtures, such as foaming agents, resins, including acrylic fortifiers, moisture resistant additives, shrinkage reducing admixtures (SRA), air-entraining (AE) admixtures, fire retardants, and chopped fibers, including glass, PVA, polypropylene, cellulose, graphite, or hybrids thereof.

Coatings/binders/finishes. Compounds, generally organic, applied to fabrics after processing (e.g., weaving or knitting) to protect the fibers and give the fabric stability.

Fiber. A general term used to refer to filamentary materials. Often, fiber is used synonymously with filament. It is generally accepted that a filament routinely has a finite length that is at least 100 times its diameter. In most cases, it is prepared by drawing from a molten bath, spinning, or by deposition on a substrate.

Filament. The smallest unit of a fibrous material. The basic units formed during drawing and spinning, which are gathered into strands of fiber for use in composites. Filaments usually are of extreme length and very small diameter. Some textile filaments can function as a yarn when they are of sufficient strength and flexibility.

Glass fiber. A fiber spun from an inorganic product of fusion that has cooled to a rigid condition without crystallizing.

Glass Filament. A form of glass that has been drawn to a small diameter and long lengths.

Inorganic Matrix. A matrix material comprising mostly inorganic ingredients, such as ceramics, glasses, cementitious materials, and geopolymers (inorganic resins), for example.

Knitted fabrics. Fabrics produced by interlooping chains of filaments, roving or yarn.

Mat. A fibrous material consisting of randomly oriented chopped filaments, short fibers, or swirled filaments loosely held together with a binder.

Roving. A number of continuous filaments, strands, or collected into a parallel bundle.

Sizing. Compounds, generally organic, applied as a fine covering to rovings after drawing of glass filaments in order to bind the individual filaments together and stiffen them to provide abrasion resistance during processing (e.g., weaving or knitting).

Tensile strength. The maximum load or force per unit cross-sectional area, within the gage length, of the specimen. The pulling stress required to break a given specimen.

Tex. A unit for expressing linear density (or gauge) equal to the weight in grams of 1 kilometer of yarn, filament, fiber or other textile strand.

Warp. The yarn, fiber or roving running lengthwise in a woven fabric. A group of yarns, fibers or roving in long lengths and approximately parallel.

Warp knit. Warp knitting is a type of knitting in which the yarns generally run lengthwise in the fabric.

Weave. The particular manner in which a fabric is formed by interlacing yarns, fibers or roving. Weave can be further defined by "type of weave", such as leno weave, for example.

Weft. The transverse threads or fibers in a woven fabric. Those fibers running perpendicular to the warp. Also called fill, filling yarn or woof.

Woven fabric. A material (usually a planar structure) constructed by interlacing yarns, fibers, roving or filaments, to form such fabric patterns as plain, harness satin, or leno weaves.

Yarn. An assemblage of filaments, fibers, or strands, either natural or manufactured, to form a continuous length that is suitable for use in knitting, weaving or interweaving into textile materials. The assemblage of filaments, fibers or strands may have some or no twist.

Referring to FIG. 1, a reinforcement system 10 is shown reinforcing a support structure 20. The present invention may be used to reinforce a wide variety of support structures. Such support structures may include, for example, walls, beams, exterior insulation fabric systems ("EIFS") slabs, chimneys, stacks, tanks, columns, silos, shafts, pipes, conduits, tunnels and the like. The support structure may be planar, circular, or any other shape. The invention is especially well suited for reinforcing support structures comprised of cementitious or masonry materials such as cement, concrete, brick, and cinder block, which may be reinforced or unreinforced. One structural support especially suited for the reinforcement system of the present invention is unreinforced masonry (URM) walls.

The reinforcement system 10 comprises at least one alkali-resistant open fibrous layer 12 (two fibrous layers are shown in FIG. 1) and an inorganic matrix 14. The fibrous layers 12 are embedded within the matrix 14. The system 10 is applied to a surface of the support structure 20.

The following detailed description and examples describe use of the present invention to support a structure through application to one surface of the structure; however, it will be understood by those skilled in the art that the present invention is not limited thereto, but may be applied to any number of surfaces depending on the shape or type of support structure. Thus, for example, the reinforcement system of the present invention may be applied to an outside surface and an inside surface of a wall of a building, pipe, wall or other structure.

The inorganic matrix 14 preferably comprises a cementitious material, such as cement paste, mortar or concrete, and/or other types of materials such as gypsum and geopolymers (inorganic resins). More preferably the inorganic matrix comprises Portland cement having chopped fibers dispersed throughout the cement. Preferably the fibers are AR-glass fibers but may also include, for example, other types of glass fibers, aramids, polyolefins, carbon, graphite, polyester, PVA, polypropylene, natural fibers, cellulosic fibers, rayon, and hybrids thereof. The inorganic matrix may include other ingredients or additives such as fly ash, latex, slag and metakaolin, resins, such as acrylics, polyvinyl acetate, or the like, ceramics, including silicon oxide, titanium oxide, and silicon nitrite, setting accelerators, water and/or fire resistant additives, such as silioxane, borax, fillers, setting retardants, dispersing agents, dyes and colorants, light stabilizers and heat stabilizers, shrinkage reducing admixtures, air entraining agents, or combinations thereof, for example. In a preferred embodiment, the inorganic matrix includes a resin that may form an adhesive bond with a resinous coating applied to the alkali-resistant open fibrous layer.

Preferably the inorganic matrix has good bonding with the support structure. Portland cement, for example, has excellent bonding to concrete, bricks and concrete masonry units (CMUs). The inorganic matrix may contain curing agents or other additives such as coloring agents, light stabilizers and heat stabilizers, for example.

One inner surface 16 of the inorganic matrix is preferably in direct contact with a surface 22 of the support structure. Due to the preferred compatibility of the inorganic matrix 14 with the support structure 20, there is no requirement that any adhesive material be applied between the two materials, however the addition of an adhesive between, or among, the inorganic matrix and the support structure is not precluded.

The alkali-resistant fibrous layers 12 are a reinforcement material for the inorganic matrix 14. The fibrous layers 12 preferably provide long term durability to the reinforcement system 10 in the highly alkaline environment of the inorganic matrix where the matrix is comprised of materials such as cement paste, mortar, or concrete or geopolymers. The fibrous layers may be comprised of glass fibers, PVA fibers, carbon fibers or aramid fibers, for example, or any combination thereof. Most preferably, the fibrous layers are comprised of AR-glass (alkali-resistant glass), such as that manufactured by Saint Gobain Vetrotex under the trademark Cem-FIL®. Unlike other types of glass fibers, such as E-glass, AR-glass has a high degree of resistance to alkali attack and a higher strength retention over time. This is due to the presence of an optimum level of Zirconia ($ZrO_2$), e.g. preferably about 10% to about 25% $ZrO_2$, in the glass fibers. This type of glass exhibits a high degree of chemical resistance, resisting the very high alkalinity produced by the hydration of cementitious materials such as ordinary Portland cement. In addition, AR-glass has superior strengthening properties necessary for use in earthquake and explosion-resistant applications. It has high tensile strength and modulus and does not rust. Although less preferred, other glass fibers may be employed, such as E-glass, ECR-glass, C-glass, S-glass and A-glass, which are not inherently alkali-resistant, when such fibers are coated with an alkali-resistant material, such as polyvinyl chloride resinous coating.

The preferred AR-glass fibers are preferably produced as rovings or yarns. The linear density of the AR-glass fibers preferably ranges from about 76 Tex where yarns are employed to 2,500 tex where rovings are employed. Where carbon fibers are used, they are preferably provided as tows, with the filament count preferably ranging from about 3,000 to 24,000. Preferred properties of the AR-glass include a virgin filament tensile strength of at least about 185,000 psi or higher, Young's modulus of elasticity of about 10–12 million psi, strain at breaking point of at least about 1.5% or higher, water uptake at less than about 0.1%, and softening temperature of about 860° C.

Figure 2:
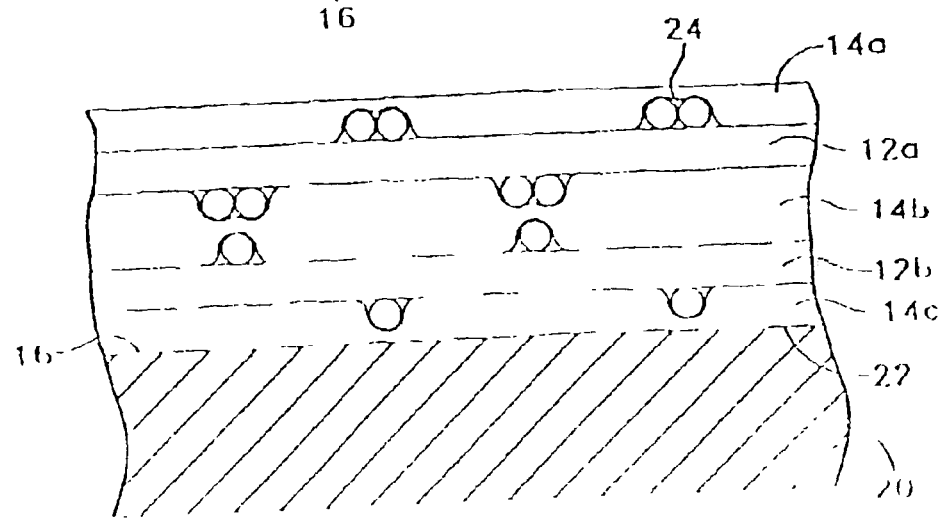
FIG. 2 is a partial cross-sectional view of a support structure having one embodiment of the reinforcement system of the present invention.

The fibrous layers 12 may be formed, for example, by various methods of weaving, such as plain or leno weave, or by knitting or laying of continuous fibers. The fibrous layers may also be laid scrim or be formed from discontinuous or continuous fibers randomly oriented in a non-woven mat. Referring to FIG. 2, in one preferred embodiment, the fibrous layers 12a and 12b are glass fiber bi-directional fibrous layers having two rovings per inch of fibers in one direction (e.g., the weft or fill direction) and one roving per inch of fiber in a direction 90 degrees from the other direction (e.g., the warp direction). (In another preferred embodiment, the glass fiber bi-directional fibrous layers have one roving per inch in each direction.) Varying fiber orientation, concentration, and fiber type permits tailoring of strength to a specific application. Using different methods of knitting, braiding or weaving of the fabric may also be employed to produce a stronger reinforcement. The openings 18 in the fibrous layer 12 (see FIG. 1) should be sufficient to allow interfacing between the layers 14a–c of the inorganic matrix 14 disposed on each side of the fibrous layers 12a and 12b.

The fibrous layer also preferably includes a sizing. Preferred sizings for use with a fibrous layer comprised of AR-glass include aqueous sizings comprising one of the following blends: 1) an epoxy polymer, vinyl and amine coupling agents and a non-ionic surfactant; 2) an epoxy polymer, amine coupling agent and a non-ionic surfactant; 3) an epoxy polymer, metacrylic and epoxy coupling agents, and cationic and non-ionic surfactants (paraffin lubricants); 4) anhydrous polymerized acrylate amine (for example, the substance disclosed in PCT Patent Application No. WO 99/31025, which is incorporated herein by reference), metacrylic and epoxy coupling agents and a non-ionic surfactant; and 5) anhydrous polymerized epoxy amine (for example, as disclosed in U.S. Pat. No. 5,961,684 to Moireau et al., which is incorporated herein by reference), vinyl and amine coupling agents, and a non-ionic surfactant, each of the above blends being produced by Cem FIL Reinforcements of Saint Gobain Vetrotex Cem-FIL® S.L., a Saint Gobain Vertrotex company. Preferably, the non-ionic surfactant comprises an organo-silane. These sizings are compatible with the preferred coatings for the AR-glass fibrous layer as described below and the cementitious matrices, and improve initial glass strength and ease of fabric forming. The sizings preferably comprise not more than 2.5% by weight, and most preferably less than 1.5% by weight of the fibrous layer.

The fibrous layers may also include an optional coating 24. Coatings are preferred where the fibrous layer is comprised of glass; however, coatings are not necessary where the fibrous layer is comprised of AR-glass, PVA, carbon or aramid fibers. The coating 24 provides mechanical and chemical protection to the glass fibrous layers 12. The coating is preferably an acrylate and/or vinyl chloride containing a polymer or polymers. Coating 24 is preferably acrylic or PVC plastisol, but may be poly vinyl alcohol (PVA), styrene-butadiene rubber (SBR), polyolefin, acrylic acid, unsaturated polyesters, vinyl ester, epoxies, polyacrylates, polyurethanes, polyolefins, phenolics, and the like. Examples of preferred coatings include an acrylic coating manufactured by Saint-Gobain Technical Fabrics, a Saint-Gobain company, under the label number 534 and a PVC plastisol coating manufactured by Saint-Gobain Technical Fabrics under the label number V38. The use of PVC plastisol as a coating further improves the alkali resistance of the fibrous layer in the inorganic matrix. The use of acrylic as a coating promotes adherence of the fibrous layer to inorganic matrix, especially where the matrix includes acrylic.

The coating can further contain a water resistant additives, such as, paraffin, and combination of paraffin and ammonium salt, fluoro chemicals designed to impart alcohol and water repellency, such as FC-824 from 3M Co., organohydrogenpolysiloxanes, silicone oil, wax-asphalt emulsions and poly(vinyl alcohol) with or without a minor amount of poly(vinyl acetate). In addition, the flame retardants, such as bromated phosphorous complex, halogenated paraffin, colloidal antimony pentoxide, borax, unexpanded vermiculate, clay, colloidal silica and colloidal aluminum can be added to the coating. Further, optional ingredients, such as pigments, preservatives, dispersants, catalysts, fillers and the like may be added to the coating.

The coating is preferably applied by dip-coating the fibrous layer into the coating, but may applied by any other technique known in the art, such as spraying, roll coating, and the like. The wt % of the coating will depend on the type of coating, preferably ranging from 10 to 200 wt % of the total weight of the coating and fiber. The coating can be applied in various thicknesses. Preferably the coating is applied so that no fibers of the fibrous layer protrude from the coating, however, the coating may alternatively be intermittently applied. After application of the coating 24, the openings 18 in the fibrous layers 12a and 12b should be sufficient to allow interfacing between the layers 14a–c of the inorganic matrix 14 disposed on each side of the fibrous layers.

According to a preferred embodiment of the present invention, the sizing and coating of an AR-glass fibrous layer are combined to optimize tensile performance and retention of tensile strength after aging, and to improve compatibility between the AR-glass, sizing, coating and cementitious matrix. Preferably the coating 24 is adherent to the sizing and the inorganic matrix 14 is adherent to the coating 24. A preferred combination includes a sizing selected from the group consisting of 1) an epoxy polymer, vinyl and amine coupling agents and a non-ionic surfactant; 2) an epoxy polymer, amine coupling agent and a non-ionic surfactant; 3) an epoxy polymer, metacrylic and epoxy coupling agents, and cationic and non-ionic surfactants (paraffin lubricants); 4) anhydrous polymerized acrylate amine, metacrylic and epoxy coupling agents and a non-ionic surfactant; and 5) anhydrous polymerized epoxy amine, vinyl and amine coupling agents, and a non-ionic surfactant, and a polymeric coating selected from the group consisting of acrylic and PVC plastisol. Table 1 shows the results of tensile strength and tensile retention testing following a 5% NaOH accelerated aging test, a Tri-alkali test (TAT) and a strand in cement (SIC) test using various coating/sizing combinations, as compared with uncoated AR-glass and E-glass.

TABLE 1

TENSILE PROPERTIES OF COATED AND UNCOATED GLASS FIBERS

| | | | | | | Tensile Strength (g/tex) | | | | Tensile Retention (%) | | |
|---|---|---|---|---|---|---|---|---|---|---|---|---|
| | | Sizing | | Coating | | Unaged | Aged TAT | Aged NaOH | Aged SIC | Retention TAT | Retention NaOH | Retention SIC |
| Material type | Label | Type | Label | Type | | Initial | TAT | NaOH | SIC | TAT | NaOH | SIC |
| Cem-FIL 5197 greige | 5197[1] | aqueous resin | none | none | | 40.65 | | | | | | |
| Cem-FIL 5197 V38 | 5197 | aqueous resin | V38[2] | PVC plastisol | | 60.14 | 61.24 | 57.05 | | 101.83 | 94.86 | |
| Cem-FIL 5197 534 | 5197 | aqueous resin | 534[3] | acrylic | | 62.40 | 39.89 | 37.97 | | 63.93 | 60.85 | |
| Cem-FIL 019/2 V38 | 019/2[4] | aqueous resin | V38 | PVC plastisol | | 71.97 | 74.15 | 64.90 | | 103.03 | 90.18 | |
| Cem-FIL 019/3 A15 | 019/3[5] | aqueous resin | A15[8] | PVA | | 57.75 | | 39.58 | | | 68.54 | |
| Cem-FIL 020/2 K29 | 020/2[7] | anhydrous resin | K29[8] | acrylic | | 88.2 | 89.93 | 45.04 | 31.5 | 101.96 | 51.07 | 35.71 |
| Cem-FIL 020/2 P3 | 020/2 | anhydrous resin | P3[9] | EEA/SA | | 86.69 | 88.85 | 53.1 | 32.7 | 102.49 | 61.25 | 37.72 |
| Cem-FIL 020/2 V38 | 020/2 | anhydrous resin | V38 | PVC plastisol | | 84.28 | 89.17 | 63.47 | 54.2 | 105.80 | 75.31 | 64.31 |
| Cem-FIL 5197 K29 | 5197 | aqueous resin | K29 | acrylic | | 64.64 | 83.85 | 0 | 26 | 129.72 | 0.00 | 40.22 |
| Cem-FIL 5197 P3 | 5197 | aqueous resin | P3 | EEA/SA | | 66.06 | 73.09 | 0 | 26.4 | 110.64 | 0.00 | 39.96 |
| Cem-FIL 020/1 A15 | 020/1[10] | anhydrous resin | A15 | PVA | | 73.93 | | 47.61 | | | 64.40 | |
| E-glass K29 | | aqueous resin | K29 | acrylic | | 83.97 | 56 | 33.16 | 14.1 | 66.69 | 39.49 | 16.79 |
| E-glass P3 | | aqueous resin | P3 | EEA/SA | | 89.09 | 68.04 | 0 | 14.4 | 76.37 | 0.00 | 16.16 |

[1] A blend of an epoxy polymer, vinyl and amine coupling agents and a non-ionic surfactant produced by Cem FIL Reinforcements.
[2] Produced by Cem FIL Reinforcements.
[3] Produced by Cem FIL Reinforcements.
[4] A blend of an epoxy polymer, vinyl and amine coupling agents and a non-ionic surfactant produced by Cem FIL Reinforcements.
[5] A blend of an epoxy polymer, metacrylic and epoxy coupling agents and non-ionic and cationic surfactants produced by Cem FIL Reinforcements.
[6] Produced by Cem FIL Reinforcements.
[7] A blend of anhydrous polymerized epoxy amine, vinyl and amine coupling agents and a non-ionic surfactant produced by Cem FIL Reinforcements.
[8] Produced by Cem FIL Reinforcements.
[9] Produced by Cem FIL Reinforcements.
[10] A blend of anhydrous polymerized acrylate amine, metacrylic and epoxy coupling agents and a non-ionic surfactant produced by Cem FIL Reinforcements.

In performing the 5% NaOH accelerated aging test, glass fiber specimens were collected from good quality, undamaged fabric. Specimens from both the machine and cross-machine direction were tested, each specimen having a length of 330 mm and a width of 50 mm. The specimens were freely submerged in an alkali bath of 5% NaOH (sodium hydroxide) in distilled water for 28 days, with the bath being replaced after each test. Following conditioning in the alkali bath, the specimens were washed with at least 1 liter of distilled water at least ten times. Following the washing, the fabric specimens were dried for seven days at room temperature. Following drying, the fabric specimens were tested in tension at a rate of 2 in/min using a 5 in. jaw span.

The TAT test was performed in accordance with the draft European Standard (Copyright 1997, CEN Members) prepared by the Technical Committee for the European Committee for Standardization (CEN) and submitted to CEN members. Coated single end samples were placed in a tri-alkali solution consisting of 1 g of NaOH, 0.5 g of Ca(OH)$_2$, and 4 g of KOH in 1 liter of distilled water at 60° C. After twenty-four hours, they were taken out and rinsed in tap water until a pH of 9 was reached. The samples were then placed in an acid solution of 0.5% HCL for one hour, taken out and rinsed in tap water until a pH of 7 was reached. The samples were then dried for one hour in a 60° C. oven. Following drying in the oven, the samples were allowed to dry at room temperature for twenty-four hours and then tested in tension.

SIC tests evaluate the alkali-resistance of glass strand or filaments in cement, by measuring the tensile strength of a strand set in a block of cement mortar. Well-stretched strands are installed in a metallic mold frame with the free ends coated with a coating mixture to protect the parts of the fibers that will not be in contact with the cement. After mixing the cement paste, having a water-to-cement ratio of 1:0.43 and a cement-to-sand ratio of 1:0.34, the mold is filled with the cement paste and vibrated to avoid formation of air bubbles near the strands. The cement is allowed to set for one hour at room temperature, then for twenty-three hours in cold water, after which the mold frame is removed.

The samples containing the cement block and strands are subsequently aged by soaking in water at 80° C. for four days. The samples are then immersed in cold water. The samples are then tested for tensile strength using a dynamometer.

The results of the TAT, NaOH accelerated aging, and SIC tests reveal that certain coated AR-glass fibers have improved tensile performance over uncoated AR-glass and E-glass. The test results also indicate that the combination of sizing and coating affects the tensile performance. Anhydrous sizings outperform aqueous sizings. Further, the results reveal that a sizing/coating combination of Cem-FIL anhydrous sizing 020 with the Cem-FIL PVC plastisol V38 coating provides the best tensile performance.

The reinforcement system 10 can be applied to an existing structural support 20 in the following exemplary manner. An outside surface 22 of the structural support 20 is wetted, preferably with water. (Prior to wetting the outside surface of the structural support, it is preferred that the surface be cleared of extraneous matter and cleaned with a mild soap, if necessary.) A first layer 14c of inorganic matrix is then applied by trowelling or similar coating technique to the wetted surface 22 of the structural support 20. It should be understood that the matrix is in a wet or uncured state when it is applied to the support 20. Preferably, the thickness of the matrix layers ranges from 1/16 to 1/4 inch, and more preferably the thickness is approximately 1/8 inch. If the thickness is too large, the matrix may exhibit shrinkage cracking.

Once the first layer 14c of inorganic matrix has been applied, an alkali-resistant fibrous layer 12b is embedded into the first layer 14c of the matrix. This may be performed by hand or by any automated method. Generally, the fibrous layers will be provided in roll form and will be cut from the roll to the desired shape and length. The fibrous layers may be oriented in a variety of ways both with respect to the orientation of the support structure and with respect to the orientation of the other fibrous layers employed in the reinforcement system. Varying the orientation of the fibrous layers in these ways can improve the strengthening and ductility characteristics of the reinforcement system.

After embedding a fibrous layer 12b into the first layer 14c of matrix, a second layer 14b of inorganic matrix is applied over the fibrous layer 12b. Again, this layer preferably has a thickness between 1/16 and 1/4 inch, and more preferably is approximately 1/8 inch. After each layer 14a–c of inorganic matrix is applied, the matrix may be trowelled to provide a substantially smooth surface.

As shown in the exemplary embodiment in FIGS. 1 and 2, after the second layer 14b of inorganic matrix has been applied, a second fibrous layer 12a may be embedded in the second layer 14b of matrix and a third layer 14a of inorganic matrix applied on top of the second fibrous layer 12a. If desired, a third fibrous layer may be embedded in the third matrix layer 14a and a fourth layer of inorganic matrix applied on top of the third fibrous layer. Although it is preferred that the reinforcement system include between 1 and 3 fibrous layers and between two and four inorganic matrix layers, additional fibrous layers and inorganic layers may be employed. The additional fibrous layers and layers of inorganic matrix will be applied in the same manner as described above. Once all the desired layers of the system have been applied, the system may be allowed to dry or cure on its own or may be cured or set by any known means.

It is preferred that the reinforcement system 10 be applied to the surface 22 of the support structure 20 so that substantially the entire surface is covered. However, in certain applications, it may be beneficial to apply the reinforcement system only to those portions of the support structure which are most likely to fail, or experience the highest load in shear or bending, for example.

The reinforcement system increases the overall performance of the structural supports by increasing the load to failure and by increasing the deflection limits or ductility of the structural support system. Unlike the conventional fiber-reinforced polymer systems which may be toxic, difficult to handle, costly, subject to delamination, and have poor fire resistance and water/air permeability, the reinforcement system of the present invention is easy to install, and has improved fire resistance and improved bonding to concrete, concrete masonry units (CMU) and brick. Additionally the reinforcement system is less likely to delaminate from the structural support, allows the concrete or CMUs to breathe due to similar air and water permeability, has a pleasant aesthetic appearance (can be blended into the concrete finish) and is lower in cost.

SPECIFIC EXAMPLES

This invention and its advantages are further described with reference to the following specific examples. The examples are merely intended to be illustrative and not to be construed as limiting the scope of the invention. In the following examples the method as described above was employed and tested on masonry wall and triplet samples. Results were obtained which indicate significantly improved seismic strengthening for the overall support system.

Example 1

Figure 3:
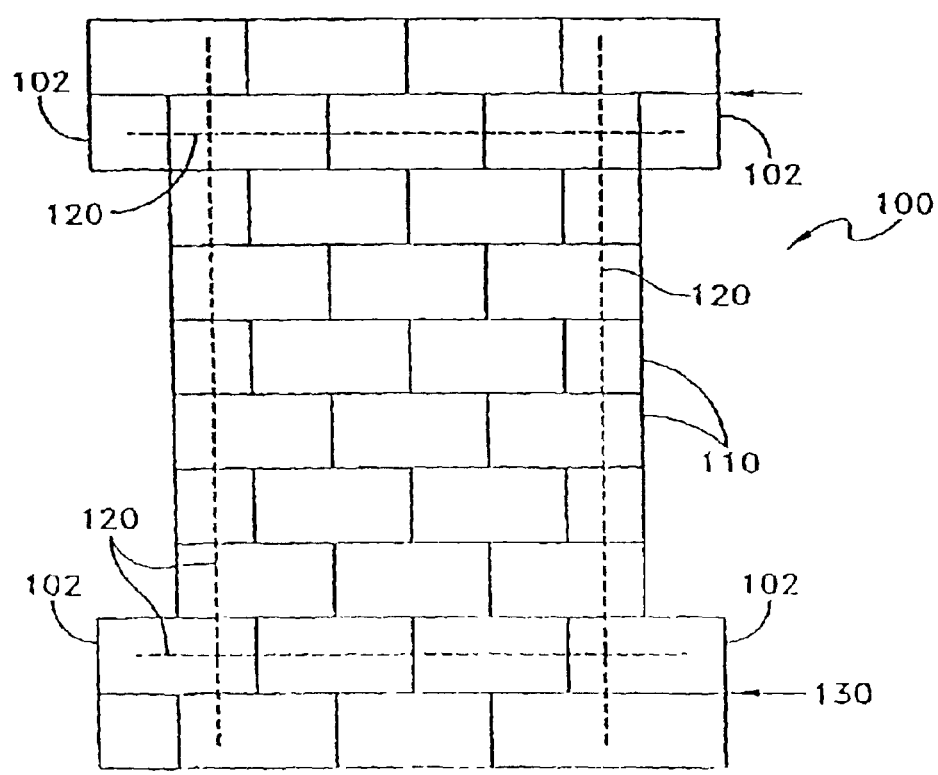
FIG. 3 is a front view of a concrete masonry unit (CMU) wall sample used in testing alternative embodiments of the reinforcement system of the present invention.

Referring to FIG. 3, a lightly reinforced sample CMU block wall 100 (wall 1) was constructed from standard 8×8×16 in. CMUs 110. The CMUs were constructed of a type N mortar, consisting of 1 part sand, 3 parts Type I Portland cement, 1 part hydrated lime, and water in sufficient quantity to make the mortar mix workable by the technician. The wall was ten courses high with the top two and bottom two courses 16 in. wider than the central six courses forming an "I" shape. All of the blocks in the top two and bottom two courses were fully grouted to get better load transfer from a load frame (see FIG. 4) during testing and increase the probability of wall failure not occurring within the wide top and bottom sections of the wall. A #4 steel reinforcing bar 120 was placed in the cells surrounding the central pier. All blocks containing steel reinforcing bars were fully grouted. Three-eighth inch face shell mortar bedding was used on the CMU blocks with the cross webs of units adjacent to grouted blocks fully bedded to prevent grout from flowing into adjacent cells. Dur-o-wal joint reinforcement 130 was placed in the bed joints between the top two and bottom two courses.

The reinforcement system of the present invention in this example was comprised of an alkali-resistant glass fibrous layer comprising AR-glass manufactured by Saint Gobain Corp. of St. Catherines, Ontario, Canada, under the trademark Cem-FIL® having a sizing comprised of a blend of epoxy polymers, vinyl and amine coupling agents, and non-ionic surfactants produced by Cem FIL Reinforcements under the product label number 5197, and a coating comprised of an acrylic, and a cementitious inorganic matrix manufactured by Quickrete Companies of Atlanta, Ga. under the trademark QuickWall®). The QuickWall® matrix was mixed in an electric mortar mixer with water and an acrylic fortifier.

The AR-glass fibrous layer was a coated bidirectional fibrous layer comprising a warp knit weft inserted opened meshed grid, with two rovings per inch in the weft direction and one roving per inch in the warp direction (see FIG. 2), and having polyester stitch yarns. The coating was comprised of an acrylic applied to the fibrous layer in a wt % of approximately 25–28% DPU. The rovings were approximately 1200 Tex. The AR-glass fibrous layer was cut from a 30-inch wide roll to the corresponding dimensions of the sample CMU block wall 100.

A first layer of QuickWall® matrix was trowelled onto the sample wall at approximately ⅛ inch thick. A first AR-glass fibrous layer was then pressed by hand into the wet matrix. The first AR-glass fibrous layer was oriented so that the weft direction of the fibrous layer having two rovings was aligned horizontal to the bottom of the sample wall. Next a second layer of matrix approximately ⅛ inch in thickness was applied by trowelling. A second AR-glass fibrous layer was then embedded by hand into the second layer of matrix. The second AR-glass fibrous layer was oriented so that the weft direction of the fibrous layer was aligned perpendicular to the bottom of the sample wall. Finally, a third layer of matrix approximately ⅛ inch in thickness was applied by trowelling onto the second fibrous layer to form a relatively smooth surface.

Before conducting the testing described below, the wall sample reinforced with the reinforcement system was allowed to cure for 30 days.

Figure 4:
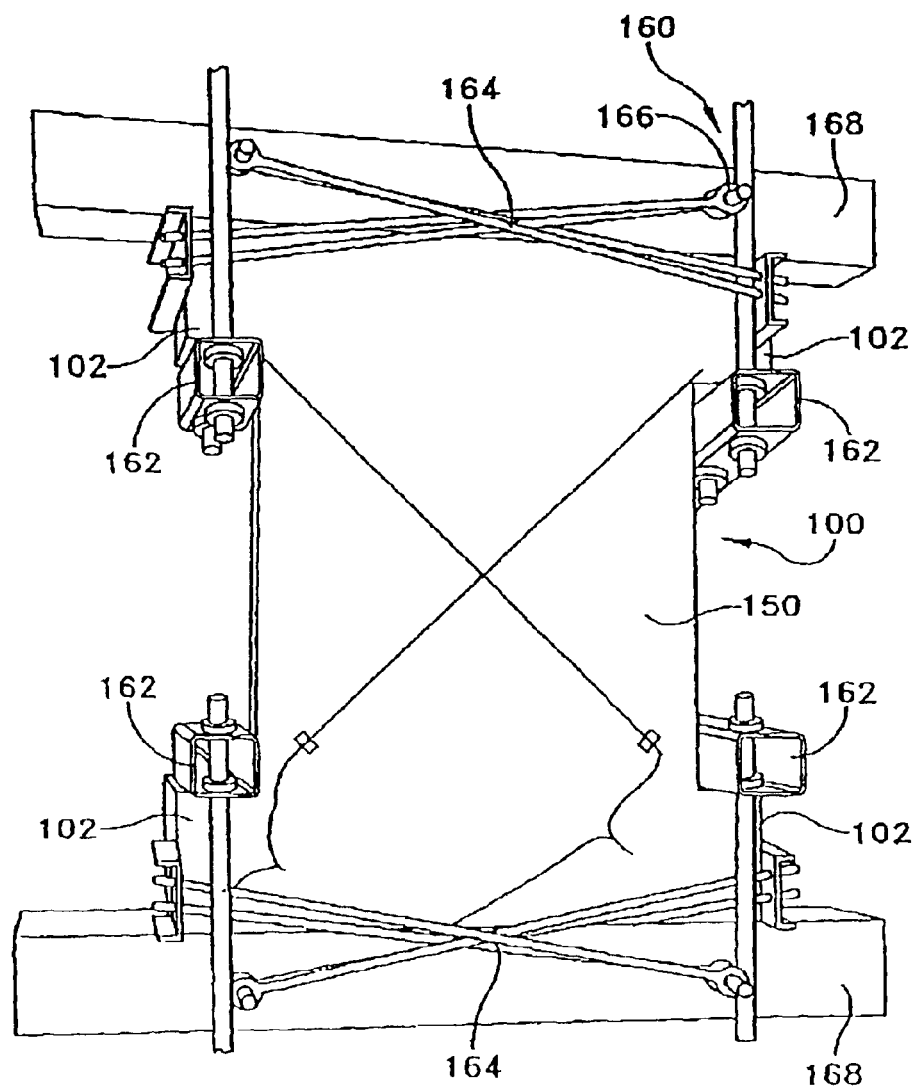
FIG. 4 is a front view of a wall sample mounted in a test frame.
Figure 5:
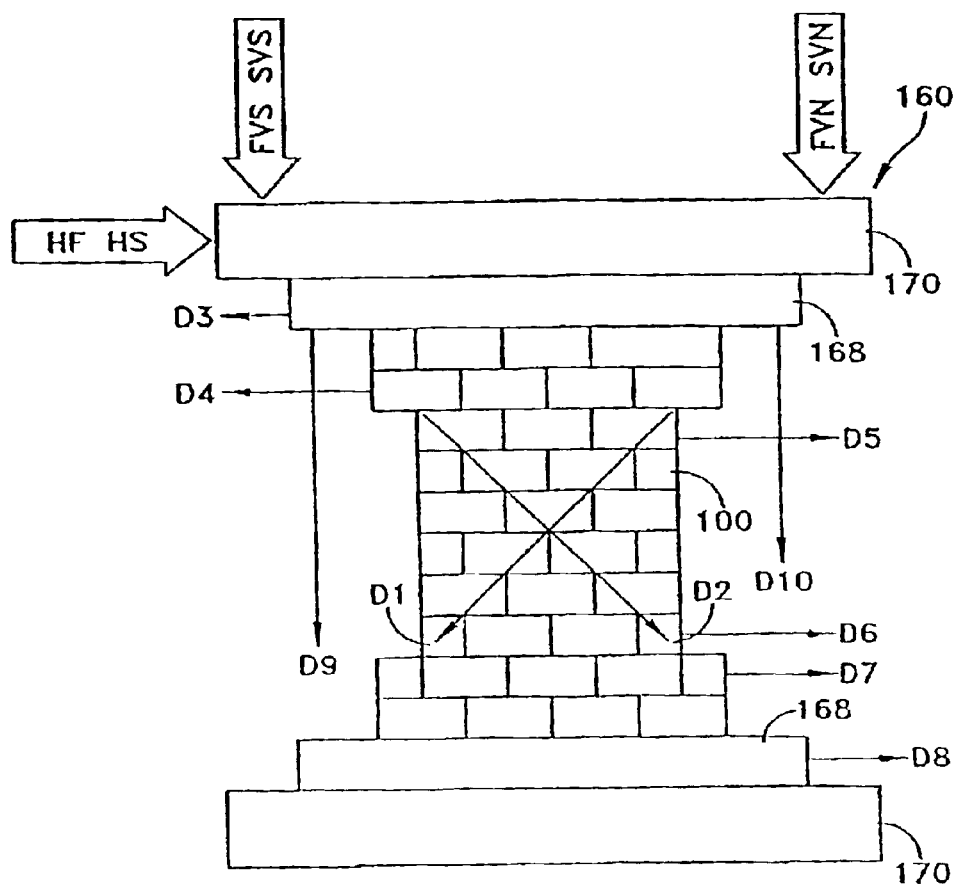
FIG. 5 is a diagram of a wall sample and test frame showing locations of displacement measurements and directions of horizontal and vertical forces.

The sample wall reinforced with the exemplary reinforcement system of the present invention according to the exemplary method of the present invention was tested for in-plane shearing at the U.S. Army Engineer Research and Development Center, Construction Engineering Research Laboratory. Referring to FIGS. 3–5, the wall sample 100 with the reinforcement system 150 applied to it was set in a load test frame 160 and clamped in place using bolted steel tubing 162 over the upper and lower specimen ears 102 and steel channels and rods 164 attached to the load frame 160 using eye bolts 166. The load floor test frame 160 was comprised of a post-tensioned reinforced concrete reaction strong wall and a steel frame. A 110-kip hydraulic actuator (not shown) with a ±20 in. stroke was attached to the strong wall to provide horizontal forces (HF) to the sample wall 100 through a steel tube 170 bolted to the upper concrete beam 168. Two 50-kip actuators (North and South) (not shown) with a ±3 in. stroke were attached to the steel frame and the horizontal steel tube 170 to provide axial (vertical) load (FVS and FVN) to simulate dead load above the wall specimen. The hydraulics for the actuator were computer-controlled.

The wall sample 100 was instrumented using two linear variable differential transducers and eight linear deflection (yo-yo) gages to monitor wall sample movements (D1–D10) (See FIG. 5). For the in-plane shear testing, the South actuator was set in load control and the North in stroke control; an initial 27 kip load was applied to each. The North actuator (applying force FVN) that was under stroke control was also slaved to the stroke signal of the South vertical actuator (applying force FVS). Loading in this manner allowed the force in the vertical actuators to vary with respect to each other while maintaining a constant 54 kip total axial load, thus forcing the top concrete beam of the test frame 160 to remain horizontal and parallel to the bottom concrete beam of the test frame 160. This configuration put an in-plane shear load in the wall sample. Cyclic horizontal forces (HF) were applied to the wall sample using the horizontal actuator. Table 2 shows the input time (sec) and displacement (in.) that the wall was subjected to during the test. Displacement forces were terminated upon wall sample failure.

TABLE 2

| Time (Sec) | Displacement (in.) |
| --- | --- |
| 0 | 0 |
| 12.5 | 0.02 |
| 25 | 0 |
| 37.5 | −0.02 |
| 50 | 0 |
| 62.5 | 0.02 |
| 75 | 0 |
| 87.5 | −0.02 |
| 100 | 0 |
| 112.5 | 0.04 |
| 125 | 0 |
| 137.5 | −0.04 |
| 150 | 0 |
| 162.5 | 0.04 |
| 175 | 0 |
| 187.5 | −0.04 |
| 200 | 0 |
| 212.5 | 0.06 |
| 225 | 0 |
| 237.5 | −0.06 |
| 250 | 0 |
| 262.5 | 0.06 |
| 275 | 0 |
| 287.5 | −0.06 |
| 300 | 0 |
| 312.5 | 0.08 |
| 325 | 0 |
| 337.5 | −0.08 |
| 350 | 0 |
| 362.5 | 0.08 |
| 375 | 0 |
| 387.5 | −0.08 |
| 400 | 0 |
| 412.5 | 0.1 |
| 425 | 0 |
| 437.5 | −0.1 |
| 450 | 0 |
| 462.5 | 0.1 |
| 475 | 0 |
| 487.5 | −0.1 |
| 500 | 0 |
| 512.5 | 0.2 |
| 525 | 0 |
| 537.5 | −0.2 |
| 550 | 0 |
| 562.5 | 0.2 |
| 575 | 0 |
| 587.5 | −0.2 |
| 600 | 0 |
| 612.5 | 0.3 |
| 625 | 0 |
| 637.5 | −0.3 |
| 650 | 0 |
| 662.5 | 0.3 |
| 675 | 0 |
| 687.5 | −0.3 |
| 700 | 0 |
| 712.5 | 0.4 |
| 725 | 0 |
| 737.5 | −0.4 |
| 750 | 0 |
| 762.5 | 0.4 |
| 775 | 0 |
| 787.5 | −0.4 |
| 800 | 0 |
| 812.5 | 0.6 |
| 825 | 0 |
| 837.5 | −0.6 |
| 850 | 0 |
| 862.5 | 0.6 |
| 875 | 0 |
| 887.5 | −0.6 |
| 900 | 0 |
| 912.5 | 0.8 |
| 925 | 0 |
| 937.5 | −0.8 |

TABLE 2-continued

| Time (Sec) | Displacement (in.) |
|---|---|
| 950 | 0 |
| 962.5 | 0.8 |
| 975 | 0 |
| 987.5 | −0.8 |
| 1000 | 0 |
| 1012.5 | 1 |
| 1025 | 0 |
| 1037.5 | −1 |
| 1050 | 0 |
| 1062.5 | 1 |
| 1075 | 0 |
| 1087.5 | −1 |
| 1100 | 0 |
| 1112.5 | 1.2 |
| 1125 | 0 |
| 1137.5 | −1.2 |
| 1150 | 0 |
| 1162.5 | 1.2 |

Figure 6:
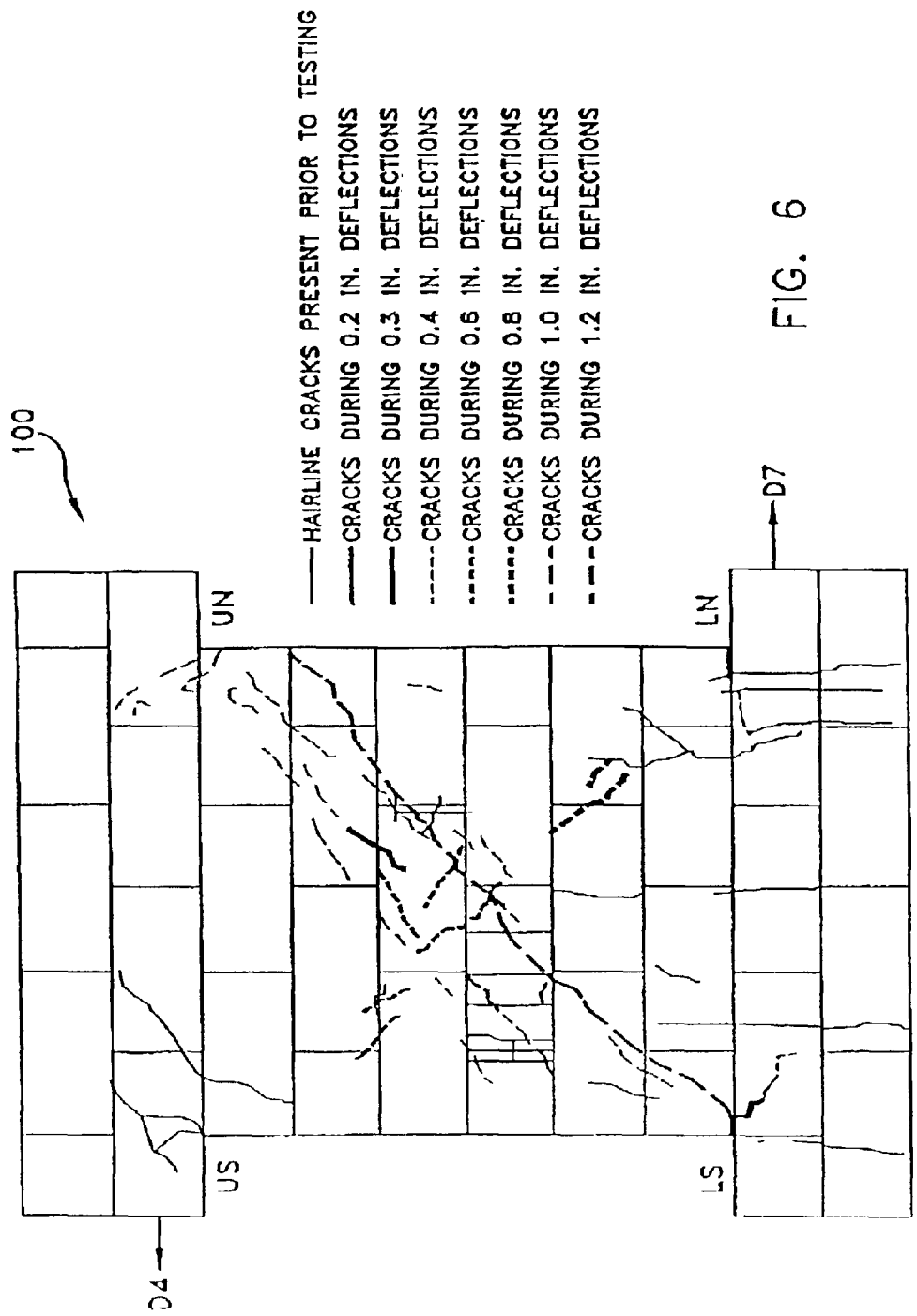
FIG. 6 is a front view of wall sample 1 showing crack growth during in-plane shear testing.

Referring to FIG. 6, during the course of the wall test for wall 1, cracking of the reinforcement began during the 0.2 inch horizontal displacement cycles at the lower corners (LS and LN) of the sample and then began to propagate downward as a typical concrete shear crack at around 45 degrees. At 0.6 and 0.8 inch horizontal displacements, cracking began to appear intermittently in the middle of the central pier starting the formation of an X-crack. At 1.0 inch displacement, significantly more cracks appeared diagonally from the upper north reentrant corner (UN) downward. At the same time cracking began growing upward and at a 45-degree angle from that corner. Finally, at 1.2 inch displacement, the reinforcement cracked from the upper north reentrant corner (UN) diagonally across the entire sample to the south reentrant corner (LS), and the back face of the pier CMU blocks sheared off and fell to the floor ending the test.

Figure 7:
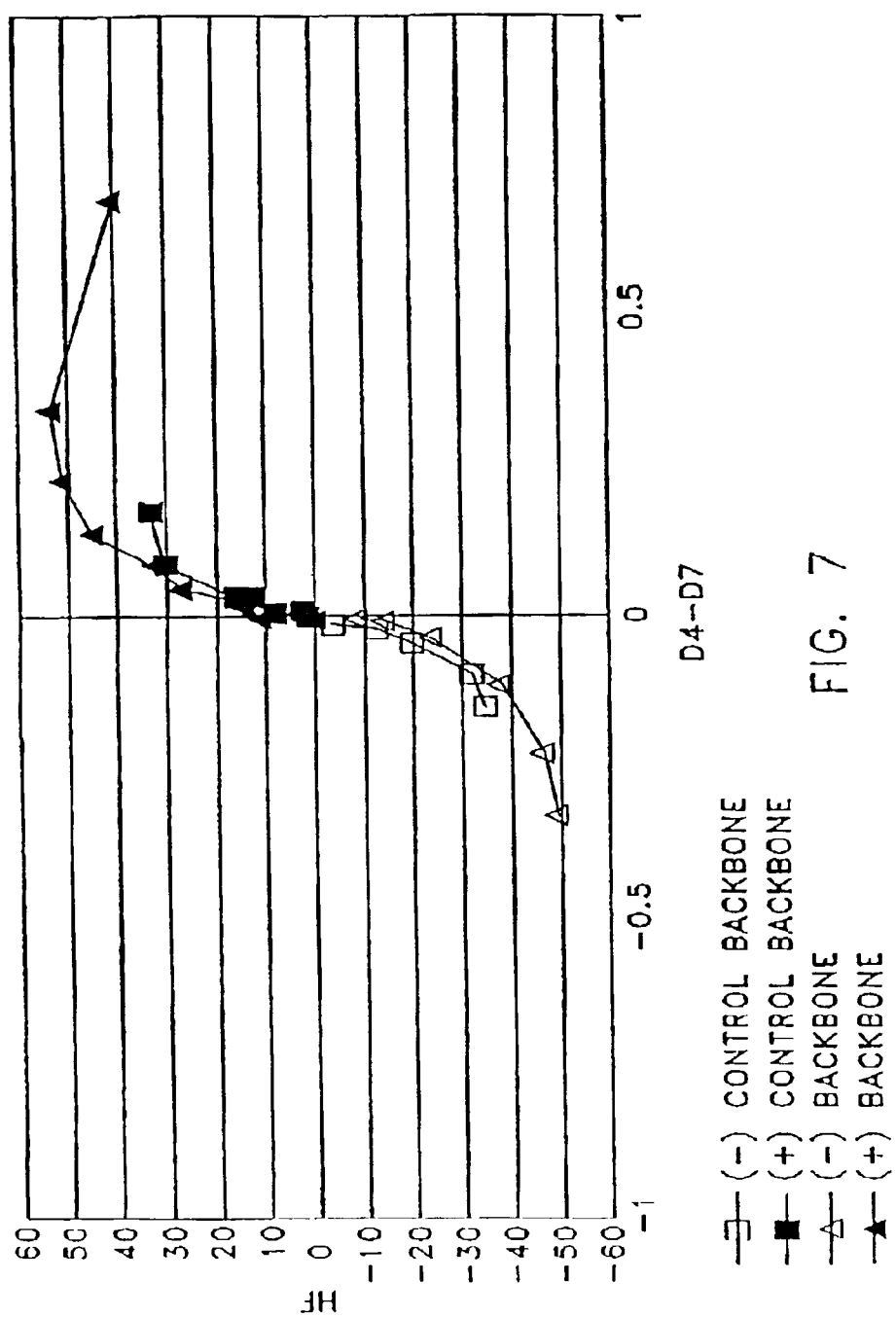
FIG. 7 is a graph showing a backbone curve of load versus displacement for the wall sample 1 and the backbone curve for the control sample.

FIG. 7 shows a backbone curve of load versus displacement (at D4 and D7) for the wall 1 sample as well as the backbone curve for the control sample. The control sample was a CMU wall as described above without the application of the reinforcement system.

Example 2

A second wall sample 200 (wall 2) having a reinforcement system applied was tested using the same testing method as described above with respect to wall sample 1. Wall 2 was made in accordance with the materials and procedure described in Example 1 and the reinforcement system applied to wall 2 was made with the materials described in Example 1. The only difference between Examples 1 and 2 is with respect to the method of reinforcement application. In applying the reinforcement system of wall 2, the first glass fibrous layer was oriented so that the weft direction of the fabric having two rovings was at a 45° angle to the bottom of the wall running from the top left corner (US) to the bottom right corner (LN). The second glass fibrous layer was oriented so that the weft direction of the fibrous layer was aligned perpendicular to the bottom of the sample wall 200.

Figure 8:
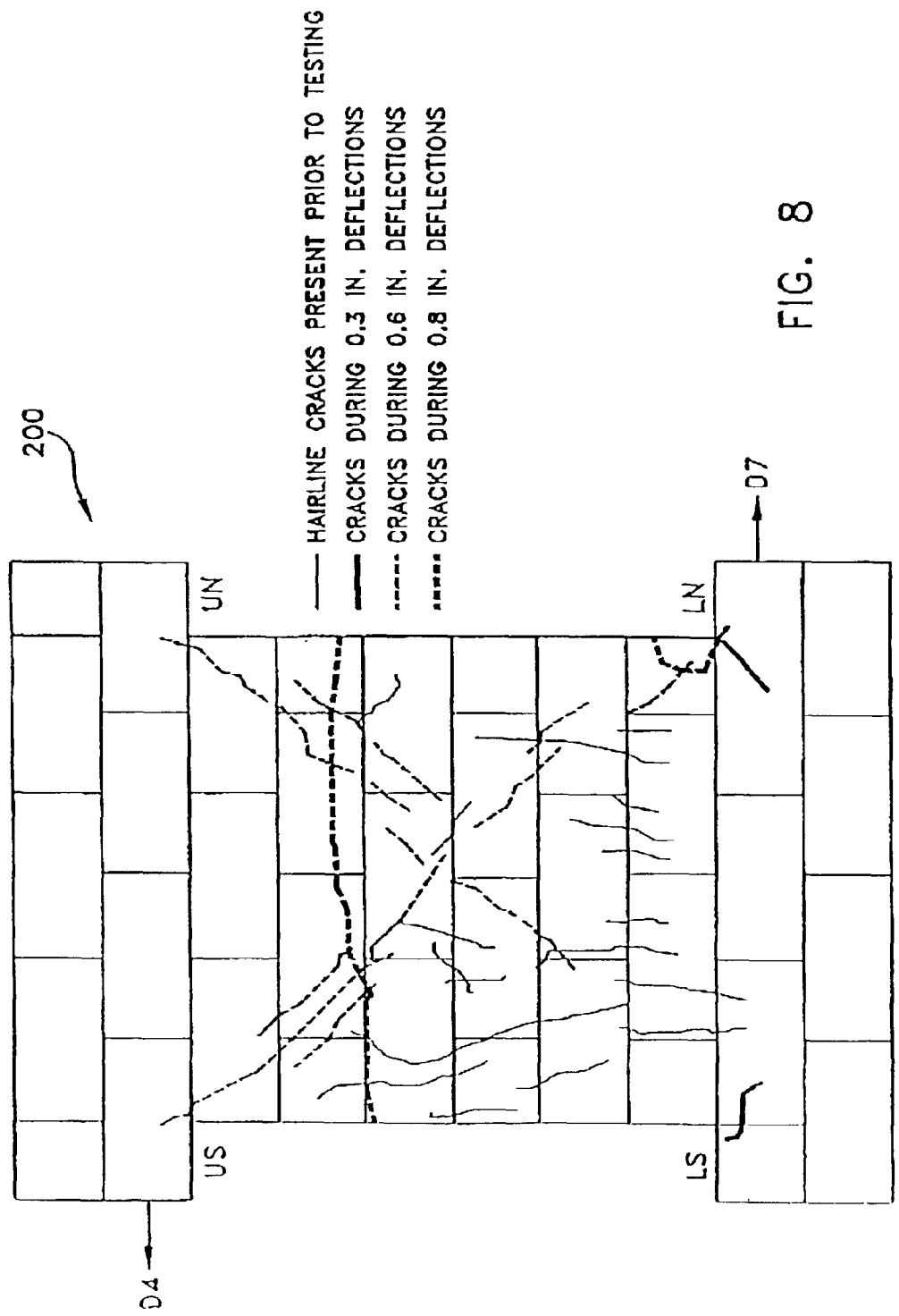
FIG. 8 is a front view of wall sample 2 showing crack growth during in-plane shear testing.

Referring to FIG. 8, the reinforcement of wall 2 began to show cracking at 0.3 inch horizontal displacement in the same way as wall 1. Cracks appeared at the lower reentrant corners (LS and LN) and propagated downward, as is typical with concrete shear crack growth. At 0.6 inch horizontal displacement, an X-crack began to appear across the central pier section of the wall. Then at 0.8 inch displacement the reinforcement developed a horizontal crack near the second pier bed joint. The back face of the CMU blocks sheared off and the wall began to buckle ending the test.

Figure 9:
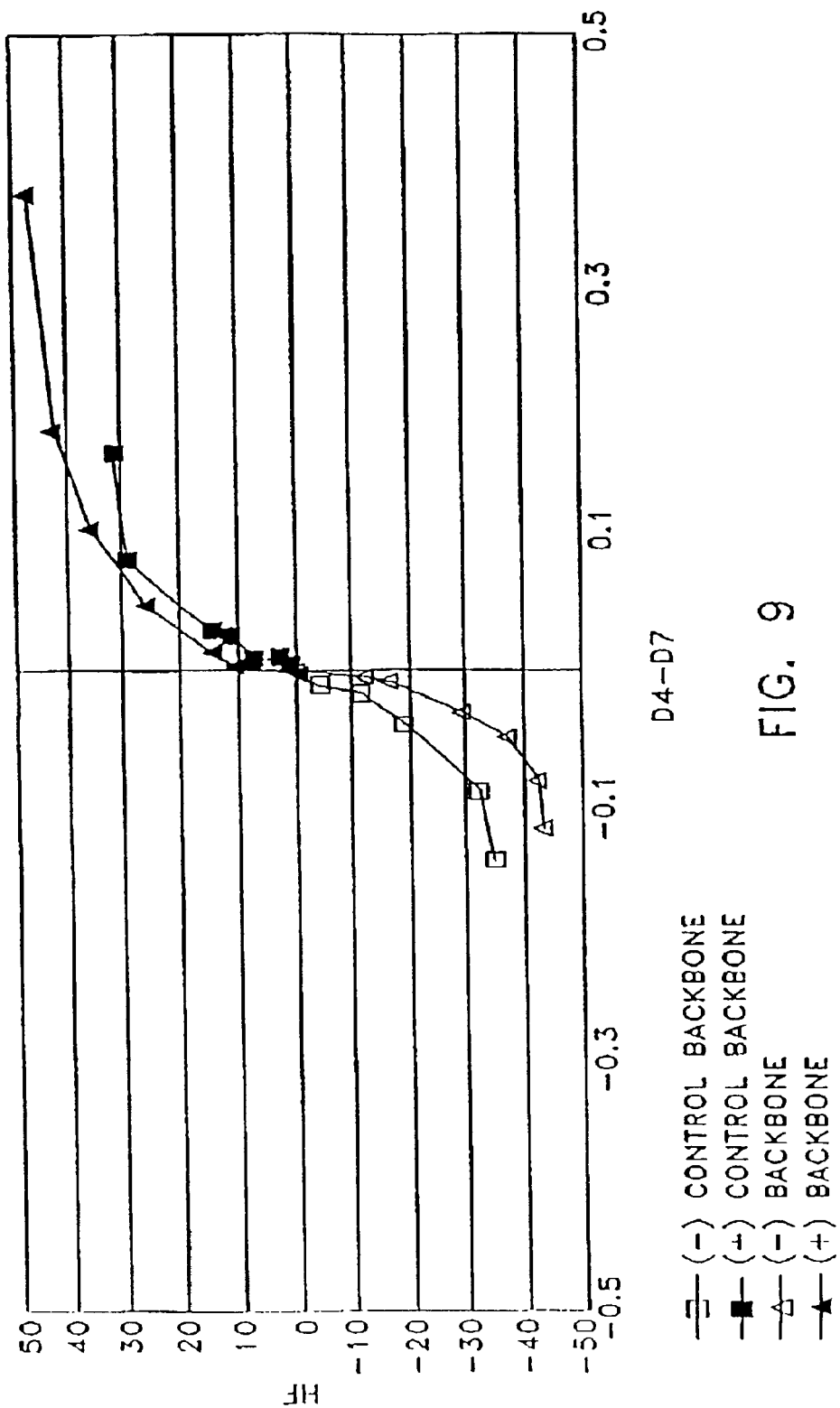
FIG. 9 is a graph showing a backbone curve of load versus displacement for the wall sample 2 and the backbone curve for the control sample.

FIG. 9 shows a backbone curve of load versus displacement (at D4 and D7) for the wall 2 sample as well as the backbone curve for the control sample. Again, the control sample was a CMU wall without the application of the reinforcement system.

Example 3

A third wall sample 300 (wall 3) having a reinforcement system applied was tested using the same testing method as described above with respect to wall samples 1 and 2. Wall 3 was made in accordance with the materials and procedure described in Example 1. The reinforcement system applied to wall 3 was made with the material compositions described in Example 1, except that the final layer of matrix applied to the reinforcement was comprised of QuickWall Sanded® material from QuickCrete having more sand than the regular QuickWall® product.

The reinforcement system applied to wall 3 included a third glass fibrous layer embedded in the third layer of matrix and a fourth layer of matrix (the QuickWall Sanded® material) applied as the top coat. In applying the reinforcement system of wall 3, the first glass fibrous layer was oriented so that the weft direction of the fabric having two rovings was at a 45° angle to the bottom of the wall running from the top left corner (US) to the bottom right corner (LN). The second glass fibrous layer was oriented so that the weft direction of the fibrous layer was at a 45° angle to the bottom of the wall running from the top right (UN) to the bottom left corner (LS). The third glass fibrous layer was oriented so that the weft direction of the fibrous layer was aligned perpendicular to the bottom of wall 3.

Figure 10:
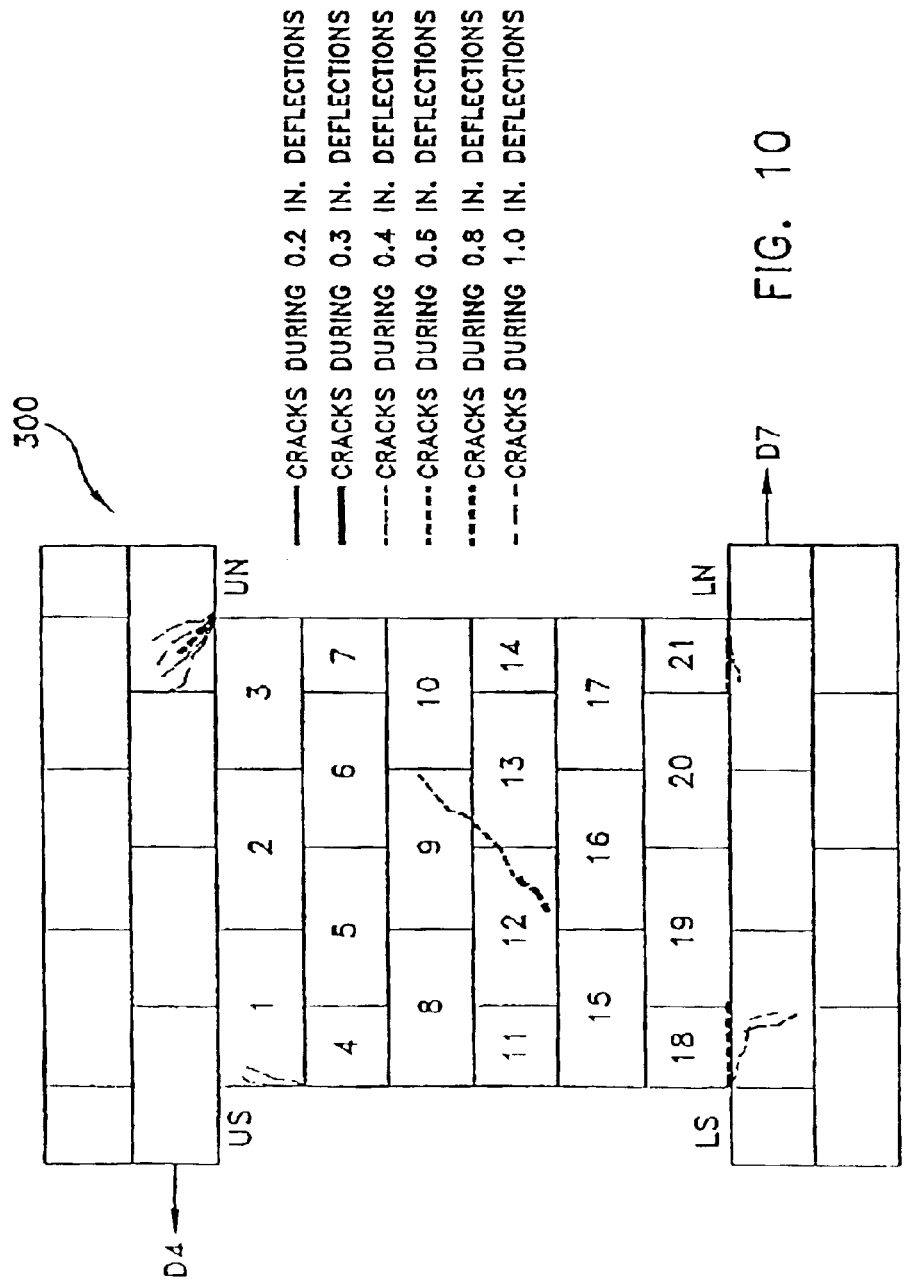
FIG. 10 is a front view of wall sample 3 showing crack growth during in-plane shear testing.

Referring to FIG. 10, cracking in the reinforcement initiated at 0.2 inch horizontal deflection in the lower north reentrant corner (LN). From 0.3 inch to 1.0 inch displacement, the crack grew along the bed joint at that location to a length of 7 inches. At 0.4 inch horizontal displacement a crack began in the other lower reentrant corner (LS), angling downward. It continued on the next amplitude of horizontal displacement. At 0.8 inch displacement, a new crack started there and followed the bed joint approximately 8 inches. A diagonal crack along the same line as the wall 1 failure initiated at 0.5 inch horizontal displacement and grew during the 0.8 displacement cycles. At 0.8 inch displacement, a crack initiated in the upper north reentrant corner (UN) angling upward. Then at 1.0 inch horizontal displacement, several more cracks initiated at that corner and all grew upward at varying angles. During the 1.0 inch horizontal displacement cycles the CMU blocks began to shear, and since the wall was in imminent danger of collapse, the test was halted. Examination of the ends and rear of the wall revealed that the back face had a well-developed X-crack and the front face was beginning to shear off just behind the reinforcement. The reinforcement did not fail during this test.

Figure 11:
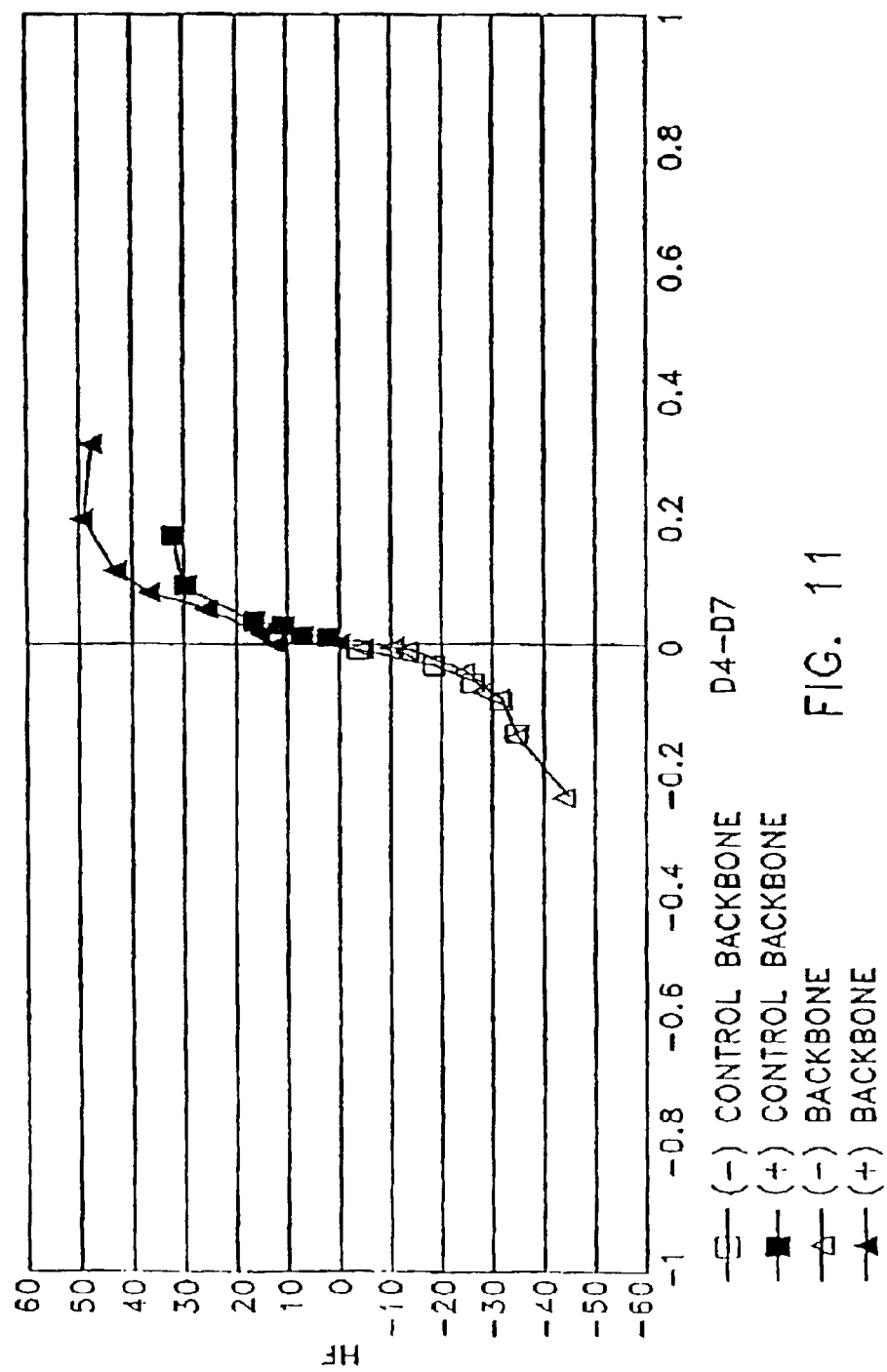
FIG. 11 is a graph showing a backbone curve of load versus displacement for the wall sample 3 and the backbone curve for the control sample.

FIG. 11 shows a backbone curve of load versus displacement (at D4 and D7) for the wall 3 sample as well as the backbone curve for the control sample. Again, the control sample was a CMU wall without the application of the reinforcement system.

Example 4

Figure 12:
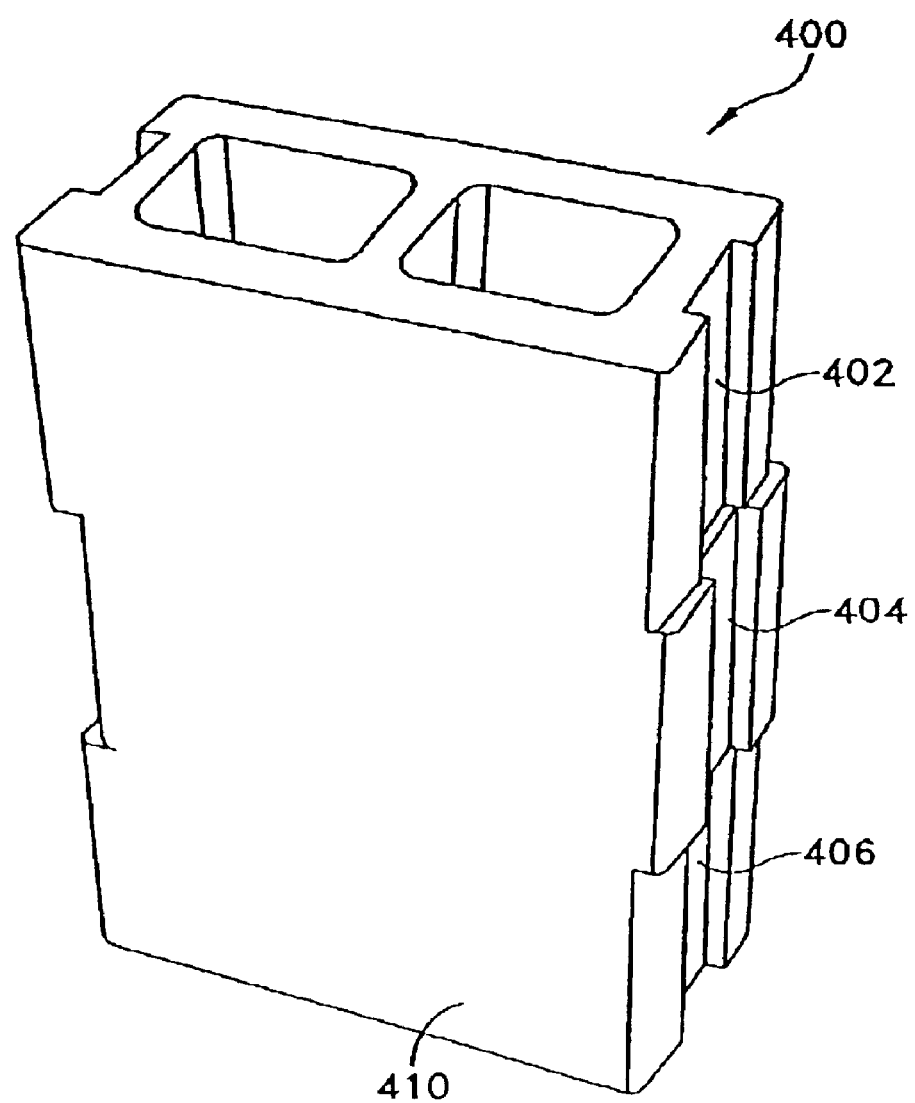
FIG. 12 is a perspective view of a triplet sample having an exemplary reinforcement system according to the present invention.

Referring to FIG. 12, three triplet samples 400 were constructed using standard 8×8×16 inch CMUs. The triplet samples 400 were constructed from three blocks 402, 404 and 406, placed in a stack-bond with the center block 404 offset by ¾ inch. The reinforcement system 410 applied to the three triplet samples was made with the material compositions described in the above Examples, except that the matrix layers were comprised of QuickWall® Sanded material as opposed to the regular QuickWall® product.

The application process of the reinforcement system for the three triplet samples 400 was identical to the application process for the three wall samples described above. The first triplet sample (triplet 1) received two glass fibrous layers. The first glass fibrous layer of the first triplet was oriented so that the weft direction of the fibrous layer having two rovings was aligned horizontal to the bottom of the triplet standing on end (as shown in FIG. 2). The second glass fibrous layer was oriented so that the weft direction of the fibrous layer was aligned perpendicular to the bottom of the triplet. The second triplet sample (triplet 2) also received two glass fibrous layers. The first glass fibrous layer of the second sample was oriented so that the weft direction of the fabric was at a 45° angle to the bottom of the triplet running from the top left corner to the bottom right corner. The second glass fibrous layer was oriented so that the weft direction of the fibrous layer was aligned perpendicular to the bottom of the triplet sample. The third triplet sample (triplet 3) received three glass fibrous layers. The first glass fibrous layer of the third triplet sample was oriented so that the weft direction of the fabric was at a 45° angle to the bottom of the triplet running from the top left corner to the bottom right corner. The second glass fibrous layer was oriented so that the weft direction of the fibrous layer was at a 45° angle to the bottom of the triplet running from the top right to the bottom left corner. The third glass fibrous layer was oriented so that the weft direction of the fibrous layer was aligned perpendicular to the bottom of the triplet. As with the wall samples, the triplets were allowed to cure for thirty days before testing.

The triplets 400 were tested in a million-pound test frame. The samples were placed on the load platen of the test frame so that the center, offset block was up. Steel plates were bolted to the ends of the triplet samples and tightened to apply a 4800-pound clamping force on the triplets. This force corresponds to the 150-psi axial load applied to the wall samples. The triplets were then loaded in compression at a constant load rate of 0.0027 in./sec. Table 3 lists the maximum loads for each of the triplet samples.

TABLE 3

MAXIMUM LOADS FOR TRIPLET TESTS

| Triplet ID | Maximum Load (lb) |
|---|---|
| 1 | 43,175 |
| 2 | 47,350 |
| 3 | 48,031 |

Figure 13:
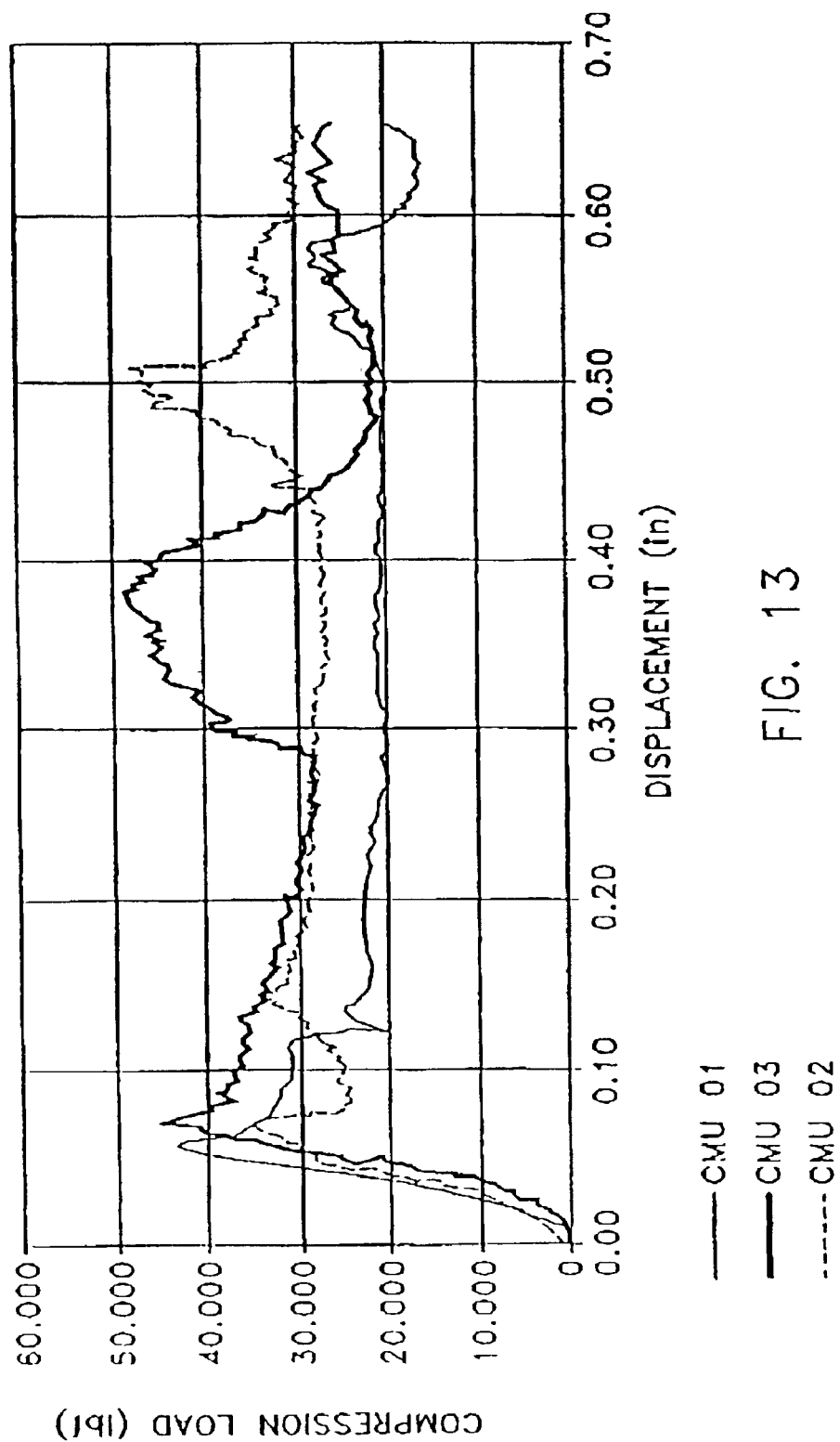
FIG. 13 is a graph showing a plot of load versus crosshead displacement for the triplet tests.

Since the reinforcement system was applied to only one face of the triplet samples, there was less resistance to the load on the face with no reinforcement applied. This resulted in a shearing of the rear face shell and compression of the center face on the back to a point level with the adjoining block faces. In all instances, the face with the reinforcement applied resisted the compression. FIG. 13 is a plot of load versus crosshead displacement for the triplet test Triplet 1 had the least damage to the reinforcement system. There were a few hairline cracks approximately 1 inch long distributed along the mortar joints at about a 30 degree angle from the horizontal.

Triplet 2 showed the most damaged to the reinforcement. Cracks developed at the reentrant corners on the triplet. A large one developed at the bottom and smaller ones developed at the top. Examination of the reinforcement revealed initiation of some delamination. After removing the triplet from the test machine, the CMU face of the center block was pulled free of the reinforcement, which remained intact.

Triplet 3 yielded small hairline cracks at the top reentrant corners of the reinforcement, which was the only visible damage to the reinforcement side of the specimen.

RESULTS

The benefit of applying the AR-glass fabric reinforced inorganic matrix to support structures such as the walls described above is to add strength to the support structure and to improve structure performance by increasing deflection limits. These benefits result in improved earthquake and explosion resistance. The backbone curves, as shown in FIGS. 7, 9, and 11 indicate the engineering strength of the support structure under consideration. The engineering strength is defined as the peak load transcribed by the back bone curve. For engineering purposes, the engineering strength is a better indicator of the system performance than the measured peak load because it incorporates a factor of safety that may or may not be present when considering the peak load value.

Figure 14:
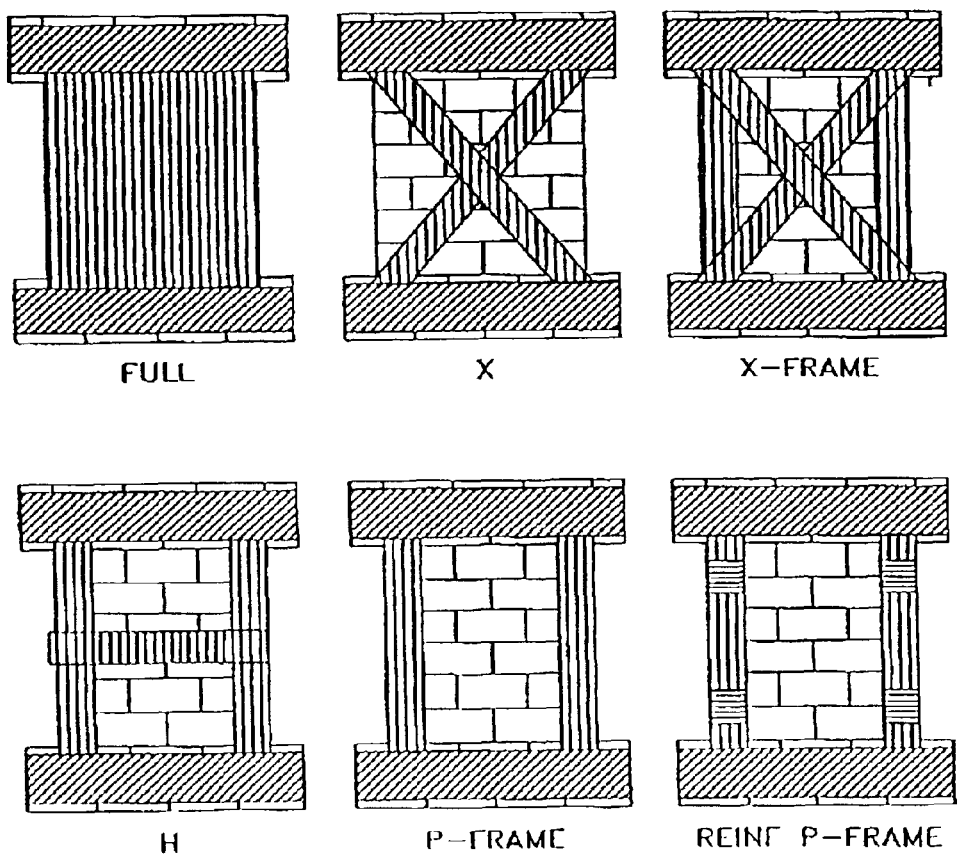
FIG. 14 illustrates different configurations of fiber-reinforced-polymer (FRP) reinforcement systems applied to wall samples tested under conditions similar to those employed in testing Walls 1–3.
Figure 15:
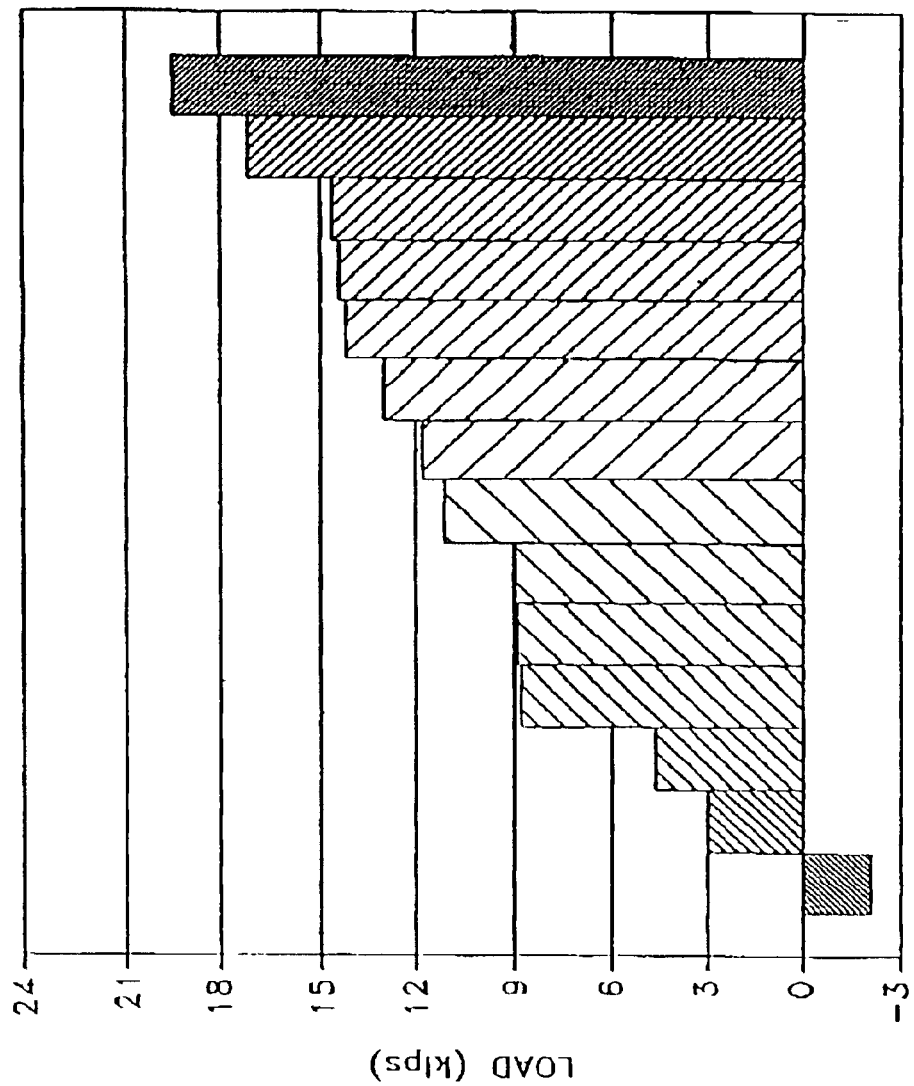
FIG. 15 is a graph comparing the engineering load increases for wall samples 1–3 to wall samples having FRP reinforcement systems applied in the different configurations shown in FIG. 14, versus the control sample having no reinforcement.

For each reinforced wall sample tested, the engineering load improved over a control sample having no reinforcement. Wall 1, exhibiting a 57% strength increase over the control, performed the best, followed by Wall 3 having a 42% increase and Wall 2 having a 38% increase. FIG. 14 illustrates different configurations of fiber-reinforced-polymer (FRP) reinforcement systems applied to wall samples tested in prior tests at the U.S. Army Engineer Research and Development Center, Construction Engineering Research Laboratory under similar conditions. The FRP reinforced samples were loaded in in-plane shear with 54 kips axial load applied to them. FIG. 15 compares the engineering load increases for sample Walls 1–3 to sample walls having FRP reinforcement systems applied in the different configurations shown in FIG. 14, over the control sample having no reinforcement.

Figure 16:
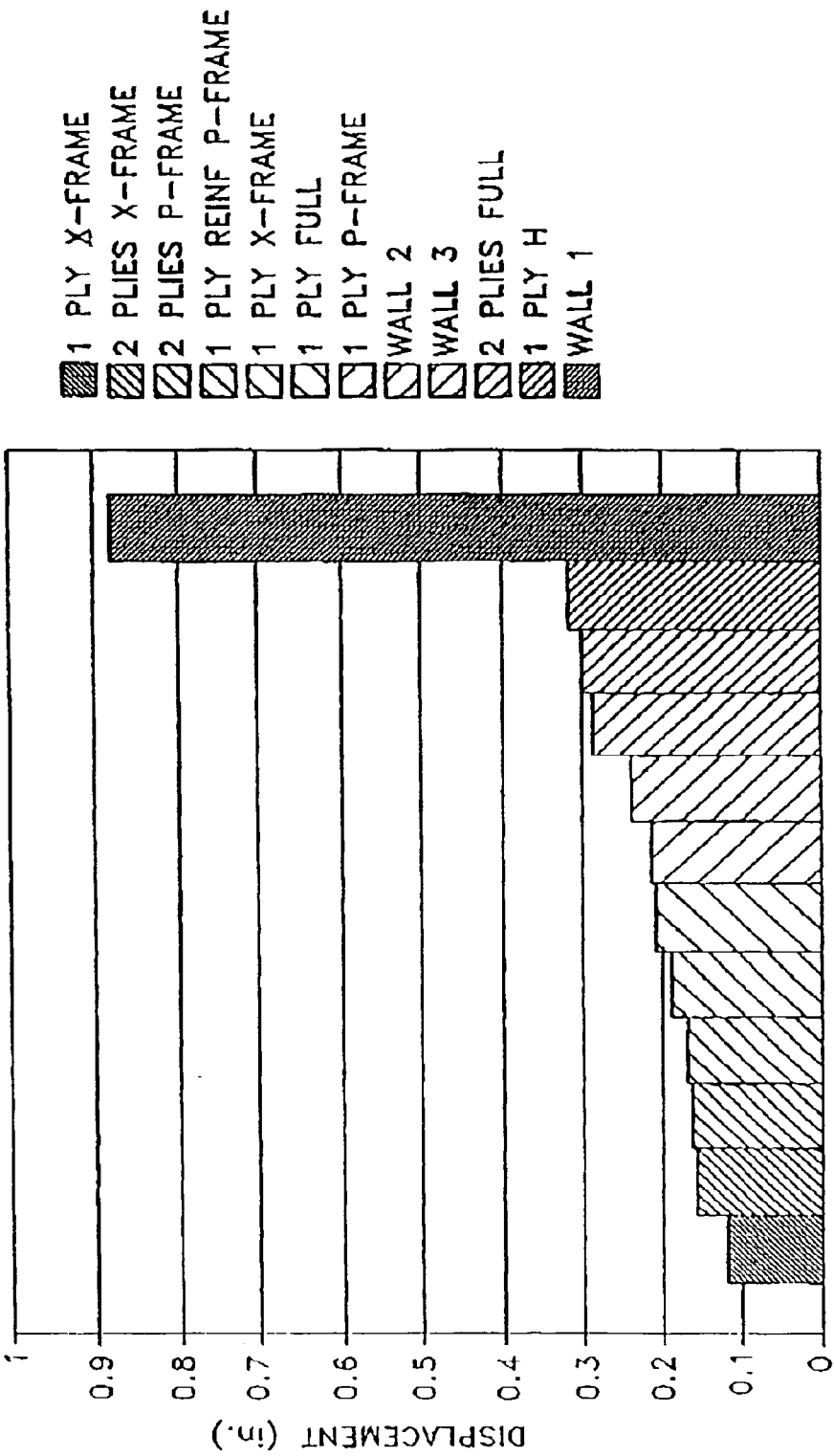
FIG. 16 is a graph comparing the wall displacements for wall samples 1–3 with each other and also to previously tested FRP reinforced wall samples.

The maximum horizontal load each wall resisted, along with the engineering load and their comparisons to the control walls are listed in Table 4. The order of maximum horizontal load resistance for each wall is the same as the engineering load order. In addition to providing the maximum strength increase, Wall 1 also exhibited the best displacement prior to failure. FIG. 16 compares the wall displacements with each other and also to FRP reinforced wall samples tested in prior tests. Table 5 lists the maximum displacement between gages D7 and D4 (See FIG. 5) for Walls 1–3, and compares those values to the with the control having no reinforcement applied. The walls tested showed improvements ranging from 29% for Wall 2 to 44% for Wall 1.

TABLE 4

WALL LOAD COMPARISONS SHOWING
MAXIMUM ENGINEERING LOAD

| Wall No. | Max Load (L) (kips) | (EL) (kips) | $\bullet_L$ (kips) | $\bullet_{EL}$ (kips) | $\bullet_L$ (%) | $\bullet_{EL}$ (%) |
|---|---|---|---|---|---|---|
| 1 | 55.7 | 53.28 | 17.68 | 19.37 | 46.50 | 57.12 |
| 2 | 49.96 | 46.81 | 11.94 | 12.9 | 31.40 | 38.04 |
| 3 | 53.25 | 48.26 | 15.23 | 14.35 | 40.06 | 42.32 |
| Control | 38.02 | 33.91 | | | | |

TABLE 5

WALL DISPLACEMENT COMPARISONS
SHOWING MAXIMUM DISPLACEMENT

| Wall No. | Max Displacement (inches) | $\bullet_s$ (inches) | $\bullet_s$ (%) |
|---|---|---|---|
| 1 | 1.224 | 0.876 | 43.97 |
| 2 | 0.577 | 0.229 | 29.13 |
| 3 | 0.631 | 0.283 | 37.64 |
| Control | 0.348 | | |

To summarize the results of the testing of Wall Samples 1–3, the AR-glass reinforced inorganic matrix reinforcing system of the present system added 47–53 kips of horizontal resistance, or 38%–57% to the engineering strength of the wall samples in in-plane shear. The material added 0.58–1.22 inches of horizontal displacement, or 29%–44% to the wall samples in in-plane shear. Wall 1, having two fibrous layers of fabric applied at 0° and 90° to each other and the wall performed better than the other configurations. Three glass fibrous layers, two aligned at ±45° and the third at 0° and 90° to the wall sample, performed better than two glass fibrous layers aligned at 0° and 90° to each other but ±45° to the wall sample. All wall failures were due to shear between the front and rear faces of the blocks. There were no delaminations of the reinforcement system of Walls 1–3 from the CMU walls.

What is claimed is:

1. A structural support system comprising:
   a structural support, and
   a reinforcement system adhered to the structural support, said reinforcement system comprising:
   an AR-glass fibrous layer embedded in an inorganic matrix, wherein said AR glass fibrous layer has a sizing applied thereon, the sizing comprising an epoxy polymer, vinyl and amine coupling agents, and a non-ionic surfactant, and
   a resinous coating applied over said sizing, the coating comprising acrylic, said inorganic matrix being adherent to said resinous coating, and said resinous coating being adherent to said sizing.

2. The support system of claim 1, wherein the inorganic matrix comprises a cementitious material.

3. The support system of claim 1, wherein the AR-glass fibrous layer is formed by weaving, knitting or adhesive-bonded cross-laid fibers.

4. The support system of claim 1, wherein the fibrous layer is formed from continuous or discontinuous fibers randomly oriented in a non-woven mat.

5. The support system of claim 1, wherein the inorganic matrix material includes chopped alkali-resistant fibers.

6. The support system of claim 1, wherein the inorganic matrix directly adheres to the structural support.

7. The support system of claim 1, wherein the structural support comprises an unreinforced masonry.

8. The support system of claim 1, wherein the structural support is comprised of bricks.

9. The support system of claim 1, wherein the structural support is comprised of concrete.

10. The support system of claim 1, wherein the structural support is comprised of cement.

11. The support system of claim 1, wherein the inorganic matrix comprises a cementitious material and chopped AR-glass fibers.

12. A structural support system comprising:
    a structural support, and
    a reinforcement system adhered to the structural support, said reinforcement system comprising an AR-glass fibrous layer embedded in an inorganic matrix, wherein said AR glass fibrous layer has a sizing applied thereon, and a resinous coating applied over said sizing, said inorganic matrix being adherent to said resinous coating, and said resinous coating being adherent to said sizing,
    wherein the coating comprises PVC plastisol and the sizing comprises anhydrous polymerized epoxy amine, vinyl and amine coupling agents and a non-ionic surfactant.

13. The reinforcement material of claim 1, wherein said inorganic matrix includes a resin which forms an adhesive bond with said resinous coating.

14. The reinforcement material of claim 1, wherein said sizing and said resinous coating form a chemical bond.

* * * * *

UNITED STATES PATENT AND TRADEMARK OFFICE
CERTIFICATE OF CORRECTION

PATENT NO. : 7,311,964 B2  Page 1 of 1
APPLICATION NO. : 10/209471
DATED : December 25, 2007
INVENTOR(S) : Aldea et al.

It is certified that error appears in the above-identified patent and that said Letters Patent is hereby corrected as shown below:

On the title page,

[*] Notice: Subject to any disclaimer, the term of this patent is extended or adjusted under 35 USC 154(b) by 88 days Delete the phrase "by 88 days" and insert -- by 858 days --

Signed and Sealed this

Tenth Day of February, 2009

JOHN DOLL
*Acting Director of the United States Patent and Trademark Office*